US012277069B2

(12) United States Patent
Mola

(10) Patent No.: US 12,277,069 B2
(45) Date of Patent: *Apr. 15, 2025

(54) MEMORY ADDRESS COMPRESSION WITHIN AN EXECUTION TRACE

(71) Applicant: Microsoft Technology Licensing, LLC, Redmond, WA (US)

(72) Inventor: Jordi Mola, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/625,675

(22) Filed: Apr. 3, 2024

(65) Prior Publication Data
US 2024/0248856 A1    Jul. 25, 2024

Related U.S. Application Data

(63) Continuation of application No. 18/548,318, filed as application No. PCT/US2022/021092 on Mar. 21, 2022, now Pat. No. 12,013,793.

(30) Foreign Application Priority Data

Mar. 26, 2021 (LU) .................................. LU102709

(51) Int. Cl.
*G06F 12/1045* (2016.01)
*G06F 11/34* (2006.01)
*G06F 12/0811* (2016.01)

(52) U.S. Cl.
CPC ...... *G06F 12/1045* (2013.01); *G06F 11/3471* (2013.01); *G06F 12/0811* (2013.01); *G06F 2201/885* (2013.01)

(58) Field of Classification Search
None
See application file for complete search history.

(56) References Cited

U.S. PATENT DOCUMENTS 10,977,192 B1 * 4/2021 Habusha ............. G06F 12/1027
2019/0266086 A1 * 8/2019 Mola .................... G06F 11/3476

* cited by examiner

*Primary Examiner* — Kaushikkumar M Patel
(74) *Attorney, Agent, or Firm* — Workman Nydegger

(57) ABSTRACT

Compressing memory addresses within an execution trace via reference to a translation lookaside buffer (TLB) entry. A microprocessor identifies a TLB entry within a TLB slot, the TLB entry mapping a virtual memory page to a physical memory page. The microprocessor initiates logging of the TLB entry by initiating logging of at least a virtual address of the virtual memory page, and an identifier that uniquely identifies the TLB entry from among a plurality of live TLB entries. Subsequently, the microprocessor identifies a cache entry within a memory cache slot, the cache entry comprising a physical memory address corresponding to a cache line. The microprocessor initiates logging of the cache entry by matching a physical memory page identification portion of the physical memory address with the TLB entry, and then initiates logging of at least the identifier for the TLB entry and an offset portion.

20 Claims, 11 Drawing Sheets

MEMORY ADDRESS COMPRESSION WITHIN AN EXECUTION TRACE

CROSS-REFERENCE TO RELATED APPLICATIONS

The present application is a continuation of U.S. patent application Ser. No. 18/548,318, filed Aug. 29, 2023, entitled, "MEMORY ADDRESS COMPRESSION WITHIN AN EXECUTION TRACE," and issued as U.S. Pat. No. 12,013,793 on Jun. 18, 2024, which is a US National Stage of International Application No. PCT/US2022/021092, filed on Mar. 21, 2022, which claimed the priority of Luxembourg Patent Application No. LU102709 filed with the Luxembourg Intellectual Property Office on Mar. 26, 2021. All of the aforementioned applications are incorporated herein in their respective entirety by this reference.

TECHNICAL FIELD

The present disclosure relates to systems, methods, and devices that record bit-accurate execution traces based on logging processor caching activity.

BACKGROUND

Tracking down and correcting undesired software behaviors is a core activity in software development. Undesired software behaviors can include many things, such as execution crashes, runtime exceptions, slow execution performance, incorrect data results, data corruption, and the like. Undesired software behaviors are triggered by a vast variety of factors such as data inputs, user inputs, race conditions (e.g., when accessing shared resources), etc. Given the variety of triggers, undesired software behaviors are often rare and seemingly random, and extremely difficult to reproduce. As such, it is often very time-consuming and difficult for a developer to identify a given undesired software behavior. Once an undesired software behavior has been identified, it is again often time-consuming and difficult to determine its root cause (or causes).

Developers use a variety of approaches to identify undesired software behaviors, and to then identify one or more locations in an application's code that cause the undesired software behavior. For example, developers often test different portions of an application's code against different inputs (e.g., unit testing). As another example, developers often reason about execution of an application's code in a debugger (e.g., by setting breakpoints/watchpoints, by stepping through lines of code, etc. as the code executes). As another example, developers often observe code execution behaviors (e.g., timing, coverage) in a profiler. As another example, developers often insert diagnostic code (e.g., trace statements) into the application's code.

While conventional diagnostic tools (e.g., debuggers, profilers, etc.) have operated on "live" forward-executing code, an emerging form of diagnostic tools enable "historic" debugging (also referred to as "time travel" or "reverse" debugging), in which the execution of at least a portion of an execution context is recorded into one or more trace files (i.e., an execution trace). Using some tracing techniques, an execution trace can contain "bit-accurate" historic execution trace data, which enables any recorded portion the traced execution context to be virtually "replayed" (e.g., via emulation) down to the granularity of individual instructions (e.g., machine code instructions, intermediate language code instructions, etc.). Thus, using "bit-accurate" trace data, diagnostic tools enable developers to reason about a recorded prior execution of subject context, as opposed to conventional debugging which is limited to a "live" forward execution. For example, using replayable execution traces, some historic debuggers provide user experiences that enable both forward and reverse breakpoints/watchpoints, that enable code to be stepped through both forwards and backwards, etc. Some historic profilers, on the other hand, are able to derive code execution behaviors (e.g., timing, coverage) from prior-executed code.

Some techniques for recording execution traces operate based largely on recording influxes to a microprocessor's (processor's) memory cache. However, since modern processors commonly execute at the rate of tens-to hundreds-of thousands of MIPS (millions of instructions per second), replayable execution traces of a program's thread can capture vast amounts of information, even if mere fractions of a second of the thread's execution are captured. As such, replayable execution traces quickly grow very large in size in memory and/or on disk.

BRIEF SUMMARY

At least some embodiments described herein operate to reduce execution trace size via new memory address compression techniques that are employed when logging memory cache entries (e.g., resulting from memory cache influxes). When logging memory cache entries, prior tracing techniques would log a full specification of a memory address associated with each memory cache entry, which included logging a specification of a memory page plus an offset from the start of the memory page to a subject cache line. Rather than logging a specification of a memory page when logging a given memory cache entry, the new memory address compression techniques described herein instead identify a logged translation lookaside buffer (TLB) entry matching with at least a portion of a memory address associated with that memory cache entry. These new memory address compression techniques then log a reference to this TLB entry (rather than logging a specification of a memory page, as would be done previously), along with an offset from the start of the memory page specified by the identified TLB entry to a subject cache line within that memory page. The logged TLB entry reference enables an appropriate memory page for the logged memory cache entry to be later determined from the TLB entry.

Notably, logging a reference to TLB entry can require significantly fewer bits than logging a specification of a memory page, and thus the number of bits used to log each memory cache entry is reduced as compared to prior logging techniques. Since memory cache entries comprise a substantial portion of an execution trace, reducing the number of bits used to log each memory cache entry results in a technical effect of significant overall trace size reductions as compared to prior tracing techniques, which conserves processing, memory, and storage resources.

In accordance with these new memory address compression techniques, some embodiments are directed to methods, systems, and computer program products for compressing memory addresses within an execution trace via reference to a TLB entry. In one implementation, a microprocessor comprises a processing unit, a TLB comprising a plurality of TLB slots, and a memory cache comprising a plurality of cache slots. The microprocessor also comprises control logic that configures the microprocessor to identify a TLB entry within one of the plurality of TLB slots, the TLB entry comprising a mapping between a virtual address of a virtual memory page within a virtual address space and a physical address of a physical memory page within a hardware memory. The control logic also configures the microprocessor to initiate logging of the TLB entry into an execution trace, including initiating logging of at least (i) the virtual address, and (ii) an identifier for the TLB entry, the identifier uniquely identifying the TLB entry from among a plurality of live entries in the TLB. The control logic also configures the microprocessor to, subsequent to identifying the TLB entry, identify a cache entry within one of the plurality of cache slots, the cache entry comprising (i) a physical memory address corresponding to a cache line, and (ii) data of the cache line, the physical memory address comprising a physical memory page identification portion and an offset portion. The control logic also configures the microprocessor to initiate logging of the cache entry into the execution trace. Initiating logging of the cache entry includes matching the physical memory page identification portion of the physical memory address with the TLB entry. Initiating logging of the cache entry also includes, based on matching the physical memory page identification portion of the physical memory address with the TLB entry, initiating logging of at least: (i) the identifier for the TLB entry and (ii) the offset portion.

At least some embodiments described herein also operate to omit physical memory addresses from an execution trace. When logging TLB entries, prior tracing techniques would log a mapping between a virtual memory page and a physical memory page. However, the inventor has recognized that replay of an execution trace need not involve reproducing a physical memory layout that was used during recording, and that physical memory page addresses therefore can be omitted when logging TLB entries into an execution trace. However, in order to ensure that shared memory interactions can be properly reproduced during replay, the embodiments herein detect when two (or more) live TLB entries map to the same physical memory page, and ensure that an indication of such is recorded into the execution trace. Since these techniques prevent logged TLB entries from containing physical memory page addresses, these embodiments result in a technical effect of preventing potentially sensitive information from making it into an execution trace, thereby improving computer security. For example, if an execution trace is recorded in a multi-tenant environment (e.g., by recording a hypervisor), these embodiments prevent potentially sensitive information about physical memory usage by tenants from being recorded into the execution trace. Additionally, by omitting physical memory page addresses from logged TLB entries, trace size reductions are achieved as compared to prior tracing techniques, thereby conserving processing, memory, and storage resources.

Related embodiments obfuscate physical memory addresses within an execution trace, rather than omitting them from the execution trace. In particular, these embodiments record some derivative of a physical memory address as part of logging a TLB entry, such as by recording an encrypted version of the physical memory address, recording a hash of the physical memory address, recording a one-way transformation of the physical memory address, and the like. Obfuscating physical memory addresses within an execution trace still provides a technical effect of preventing potentially sensitive information from making it into an execution trace, thereby improving computer security. At the same time, obfuscating physical memory addresses within an execution trace also enables analysis of a traced program's use of physical memory (even if the actual physical memory addresses are not available), which can enable, for example, debugging of memory management routines.

In accordance with these physical address omission/obfuscation techniques, some embodiments are directed to methods, systems, and computer program products for omitting or obfuscating physical memory addresses within an execution trace. In one implementation, a microprocessor comprises a processing unit, a TLB comprising a plurality of TLB slots, and a memory cache comprising a plurality of cache slots. The microprocessor also comprises control logic that configures the microprocessor to identify a first TLB entry in a first of the plurality of TLB slots, the first TLB entry comprising a first mapping between a first virtual address of a first virtual memory page within a first virtual address space and a physical address of a physical memory page within a hardware memory. The control logic also configures the microprocessor to initiate logging of the first TLB entry into an execution trace, including initiating logging of at least (i) the first virtual address, and (ii) a first identifier for the first TLB entry. The control logic also configures the microprocessor to identify a second TLB entry in a second of the plurality of TLB slots, the second TLB entry comprising a second mapping between a second virtual address of a second virtual memory page within a second virtual address space and the physical address of the physical memory page within the hardware memory that is mapped to by the first TLB entry. The control logic also configures the microprocessor to initiate logging of the second TLB entry into the execution trace, including initiating logging of at least (i) the second virtual address, and (ii) a second identifier for the second TLB entry. The control logic also configures the microprocessor to, in connection with initiating logging of the second TLB entry into the execution trace, determine that the first TLB entry and the second TLB entry each (i) are live in the TLB, (ii) are logged into the execution trace, and (iii) have common mappings to the physical address. The control logic also configures the microprocessor to, based at least on the determination, ensure that the execution trace indicates that the first TLB entry and the second TLB entry each map to the physical address.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
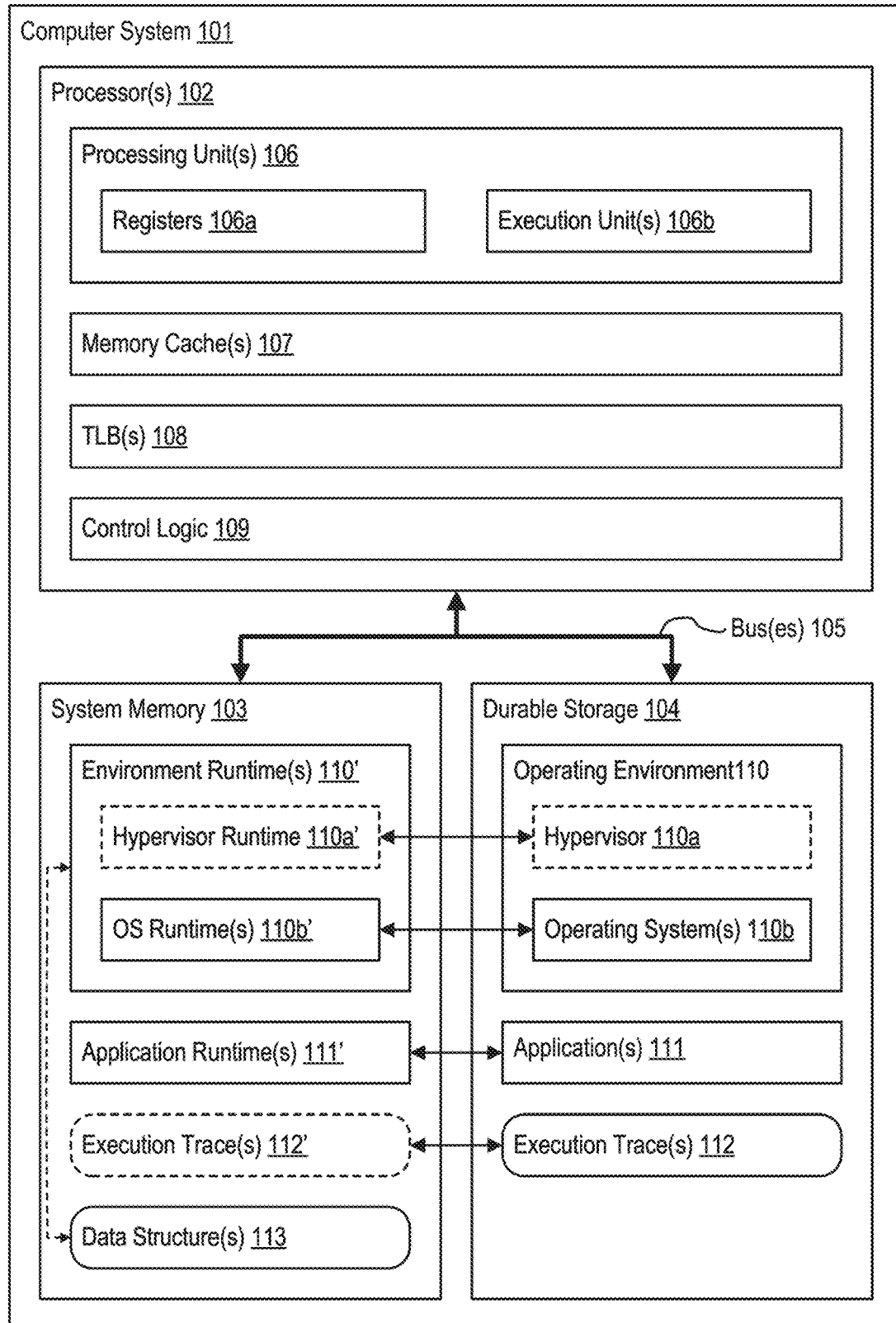
FIG. 1A illustrates an example computing environment that facilitates memory address compression within an execution trace via reference to a TLB entry, including the potential for physical memory address omission or obfuscation within the execution trace.

FIG. 1A illustrates an example computing environment 100a that facilitates memory address compression within an execution trace via reference to a TLB entry, including the potential for physical memory address omission or obfuscation within the execution trace. In particular, computing environment 100a includes a computer system 101 (e.g., a special-purpose or general-purpose computing device), which includes a processor 102 (or a plurality of processors) that is configured to participate in recording a bit-accurate execution trace. As shown, in addition to processor 102, computer system 101 also includes system memory 103 and durable storage 104, which are communicatively coupled to each other, and to the processor 102, using at least one communications bus 105.

Embodiments within the scope of the present invention can include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media (e.g., system memory 103 and/or durable storage 104) that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (not shown), and then eventually transferred to computer system RAM (e.g., system memory 103) and/or to less volatile computer storage media (e.g., durable storage 104) at the computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, machine code instructions (e.g., binaries), intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

As shown in FIG. 1A, in embodiments the processor 102 includes a processing unit 106 (or a plurality of processing units), a memory cache 107 (or a plurality of memory caches), a TLB 108 (or a plurality of TLBs), and control logic 109 (e.g., gate logic, executable microcode, etc.). Each processing unit 106 (e.g., processor core) loads and executes machine code instructions on at least one execution unit 106b. During execution of these machine code instructions, the instructions can use registers 106a as temporary storage locations, and can read and write to various locations in system memory 103 via the memory cache 107. Each processing unit 106 executes machine code instructions that are defined by a processor instruction set architecture (ISA). The particular ISA of each processor 102 can vary based on processor manufacturer and processor model. Common ISAs include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other ISAs exist and can be used by the present invention. In general, a machine code instruction is the smallest externally-visible (i.e., external to the processor) unit of code that is executable by a processor.

Registers 106a are hardware storage locations that are defined based on the ISA of the processor 102. In general, registers 106a are read from and/or written to by machine code instructions, or a processing unit 106, as those instructions execute at execution units 106b. Registers 106a are commonly used to store values fetched from the memory cache 107 for use as inputs to executing machine code instructions, to store the results of executing machine code instructions, to store a program instruction count, to support maintenance of a thread stack, etc. In some embodiments, registers 106a include "flags" that are used to signal some state change caused by executing machine code instructions (e.g., to indicate if an arithmetic operation cased a carry, a zero result, etc.). In some embodiments, registers 106a include one or more control registers (e.g., which are used to control different aspects of processor operation), and/or other processor model-specific registers (MSRs).

The memory cache 107 temporarily caches blocks of system memory 103 during execution of machine code instructions by processing unit 106. In some implementations, the memory cache 107 includes one or more "code" portions that cache portions of system memory 103 storing application code, as well as one or more "data" portions that cache portions of system memory 103 storing application runtime data. If a processing unit 106 requests data (e.g., code or application runtime data) not already stored in the memory cache 107, then the processing unit 106 initiates a "cache miss," causing one or more blocks of data to be fetched from system memory 103 and influxed into the memory cache 107—while potentially replacing and "evicting" some other data already stored in the memory cache 107 back to system memory 103.

Figure 2:
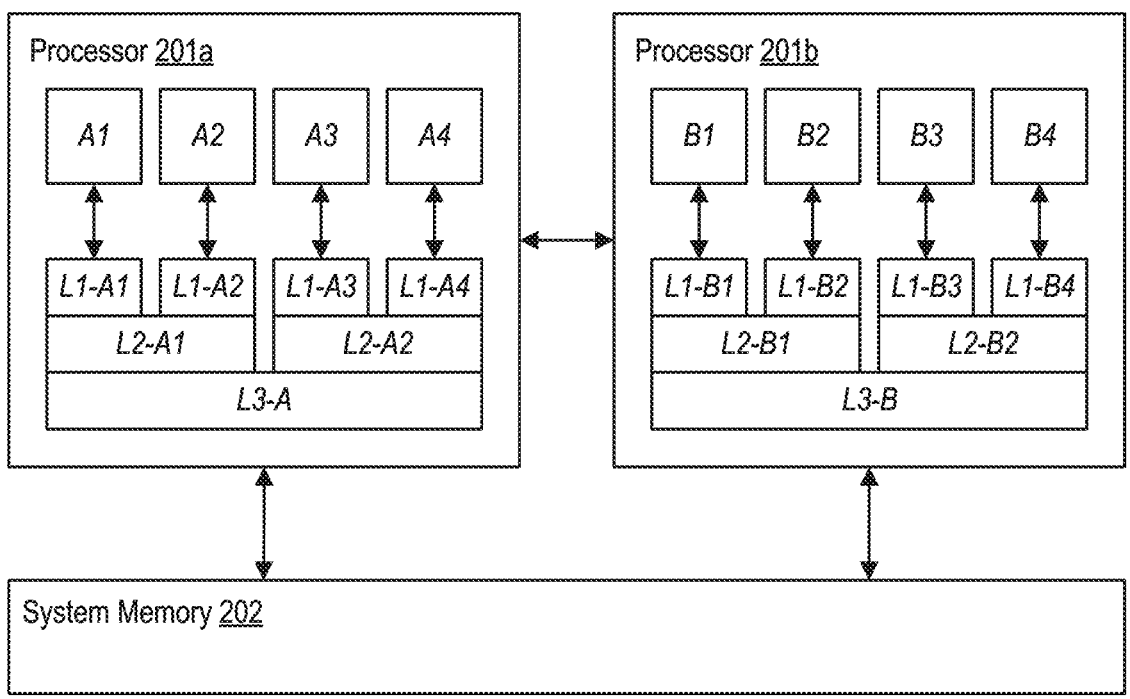
FIG. 2 illustrates an example environment demonstrating multi-level memory caches.

In the embodiments herein, the memory cache 107 comprises multiple cache levels (sometimes referred to cache tiers or cache layers)—such as a level 1 (L1) cache, a level 2 (L2) cache, a level 3 (L3) cache, etc. For example, FIG. 2 illustrates an example environment 200 demonstrating multi-level memory caches. In FIG. 2, the example environment 200 comprises two processors 201—processor 201a and processor 201b (e.g., each a processor 102 in FIG. 1A) and a system memory 202 (e.g., system memory 103 of FIG. 1A). In the example environment 200, each processor 201 comprises four processing units (e.g., each a processing unit 106 in FIG. 1A), including processing units A1-A4 for processor 201a and processing units B1-B4 for processor 201b.

In example environment 200, each processor 201 also includes a three-level memory cache hierarchy. Environment 200 is one example memory cache layout only, and it is not limiting to the memory cache hierarchies in which the embodiments herein may operate. In environment 200, each processing unit includes its own dedicated L1 memory cache (e.g., L1 memory cache "L1-A1" in processor 201a for unit A1, L1 memory cache "L1-A2" in processor 201a for unit A2, etc.). Relative to the L1 memory caches, each processor 201 also includes two upper-level L2 memory caches (e.g., L2 memory cache "L2-A1" in processor 201a that serves as a backing store for L1 memory caches L1-A1 and L1-A2, L2 memory cache "L1-A2" in processor 201a that serves as a backing store for L1 memory caches L1-A3 and L1-A4, etc.). Finally, relative to the L2 memory caches, each processor 201 also includes a single L3 memory cache (e.g., L3 memory cache "L3-A" in processor 201a that serves as a backing store for L2 memory caches L2-A1 and L2-A2, and L3 memory cache "L3-B" in processor 201b that serves as a backing store for L2 memory caches L2-B1 and L2-B2).

As shown, system memory 202 serves as a backing store for the L3 memory caches L3-A and L3-B. In this arrangement, and depending on implementation, cache misses in an L1 memory cache might be served by its corresponding L2 memory cache, its corresponding L3 memory cache, and/or system memory 202; cache misses in an L2 memory cache might be served by its corresponding L3 memory cache and/or system memory 202; and cache misses in an L3 memory cache might be served by system memory 202.

In some environments, some memory cache levels exist separate from a processor; for instance, in environment 200 one or both of the L3 memory caches could alternatively exist separate from processors 201, and/or environment 200 could include one or more additional memory caches (e.g., L4, L5, etc.) that exist separate from processors 201.

As demonstrated by the arrows within each processor 201, when multiple memory cache levels exist, each processing unit typically interacts directly with the lowest level (e.g., L1). In many implementations, data flows between the levels (e.g., an L3 memory cache interacts with the system memory 202 and serves data to an L2 memory cache, and the L2 memory cache in turn serves data to the L1 memory cache). However, as will be appreciated by one of ordinary skill in the art, the particular manner in which processing units interact with a memory cache, and the particular manner in which data flows between memory cache levels, may vary (e.g., depending on whether the memory cache is inclusive, exclusive, or some hybrid).

Given their arrangement, the memory caches in environment 200 may be viewed as "shared" memory caches. For example, each L2 and L3 memory cache serves multiple processing units within a given processor 201 and are thus shared by these processing units. The L1 memory caches within a given processor 201, collectively, can also be considered shared—even though each one corresponds to a single processing unit—because the individual L1 memory caches may coordinate with each other via a cache coherency protocol (CCP) to ensure consistency (i.e., so that each cached memory location is viewed consistently across all the L1 memory caches). The L2 memory caches within each processor 201 similarly may coordinate via a CCP. Additionally, each individual L1 memory cache may be shared by two or more physical or logical processing units, such as where the processor 201 supports hyper-threading, and are thus "shared" even at an individual level.

Figure 3:
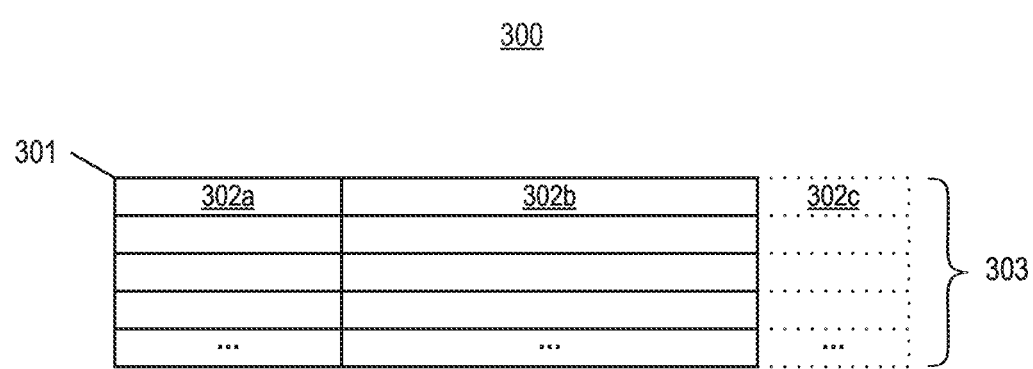
FIG. 3 illustrates an example of a memory cache.

In embodiments, each level of the memory cache 107 comprises a plurality of slots 303 that store cache lines (also commonly referred to as cache blocks). Each cache line corresponds to a contiguous block of system memory 103. For example, FIG. 3 illustrates an example 300 of a memory cache 301 (e.g., an L1 memory cache, an L2 memory cache, etc.) that includes a plurality of slots 303. In example 300, each slot 303 stores at least an address portion 302a that stores a memory address, and a cache line portion 302b that stores cache line data corresponding to that memory address. During an influx to a given slot 303 of the memory cache 301, the slot's cache line portion 302b is generally filled with a block of data obtained from an upper-level memory cache, or from the system memory 103. Depending on a size of the cache line portion 302b, each slot 303 may potentially store data spanning a plurality of consecutive individually addressable locations within the system memory 103. The cache line portion 302b of each slot 303 can be modified by processing unit 106, and eventually be evicted back to an upper-level memory cache, or to the system memory 103. As indicated by the ellipses within the memory cache 301, each memory cache can include a large number of slots. For example, a contemporary 64-bit INTEL processor may contain individual L1 memory caches for each processing unit 106 comprising 512 or more slots. In such a memory cache, each slot is typically used to store a 64-byte (512-bit) value in reference to a 6-byte (48-bit) to 8-byte (64-bit) memory address. As shown, memory caches are generally larger in size (i.e., more slots) as their level increases. For example, an L2 memory cache is generally larger than an L1 memory cache, an L3 memory cache is generally larger than an L2 memory cache, and so on.

As mentioned, memory caches coordinate using a CCP. In general, a CCP defines how consistency is maintained between various memory caches as various processing units read from and write data to those caches, and how to ensure that the processing units always read consistent data for a given cache line. CCPs are typically related to, and enable, a memory model defined by the processor's instruction set architecture (ISA). Examples of popular ISA's include the x86 and x86_64 families of architectures from INTEL, and the ARM architecture from ARM HOLDINGS. Examples of common CCPs include the MSI protocol (i.e., Modified, Shared, and Invalid), the MESI protocol (i.e., Modified, Exclusive, Shared, and Invalid), and the MOESI protocol (i.e., Modified, Owned, Exclusive, Shared, and Invalid). Each of these protocols define a state for individual cache line stored in a shared memory cache. A "modified" cache line contains data that has been modified in the shared memory cache and is therefore inconsistent with the corresponding data in the backing store (e.g., system memory 103 or another memory cache). When a cache line having the "modified" state is evicted from the shared memory cache, common CCPs require the cache to guarantee that its data is written back the backing store, or that another memory cache take over this responsibility. A "shared" cache line is not permitted to be modified, and may exist in a shared or owned state in another memory cache. The shared memory cache can evict this data without writing it to the backing store. An "invalid" cache line contains no valid data and can be considered empty and usable to store data from cache miss. An "exclusive" cache line contains data that matches the backing store and is used by only a single processing unit. It may be changed to the "shared" state at any time (i.e., in response to a read request) or may be changed to the "modified" state when writing to it. An "owned" cache location contains data that that is inconsistent with the corresponding data in the backing store. When a processing unit makes changes to an owned cache location, it notifies the other processing units—since the notified processing units may need to invalidate or update based on the CCP implementation.

As shown, each slot in the memory cache 301 may include one or more additional portions 302c. In some embodiments, one additional portion 302c comprises one or more tracking bits used to track whether a cache line stored in a corresponding slot 303 has been logged to a trace or not, as described infra. In some embodiments, an additional portion 302c stores a tag that comprises one or more data fields for storing information relevant to its corresponding slot 303. In embodiments, the slots of at least one memory cache level comprises the additional portion 302c for storing tags, and those embodiments use those tags to improve trace logging, as described infra.

In some situations, the address portion 302a of each slot 303 stores a physical memory address, such as the actual corresponding memory address in the system memory 103. In other situations, the address portion 302a of each slot 303 stores a virtual memory address. In embodiments, a virtual memory address is an address within a virtual address space that is exposed by an operating system to a process executing at the processor 102. This virtual address space provides one or more abstractions to the process, such as that the process has its own exclusive memory space and/or that the process has more memory available to it than actually exists within the system memory 103. Such abstractions can be used, for example, to facilitate memory isolation between different processes executing at the processor 102, including isolation between user-mode processes and kernel-mode processes.

In embodiments, virtual to physical memory address mappings are maintained within one or more memory page tables that are stored in the system memory 103, and that are managed by an operating system and/or hypervisor (e.g., operating environment 110, described infra). In general, these memory page tables comprise a plurality of page table entries (PTEs) that map ranges (i.e., pages) of virtual memory addresses to ranges (i.e., pages) of physical memory addresses. In embodiments, each PTE stores additional attributes, or flags, about its corresponding memory pages, such as memory page permissions (e.g., read-only, writeable, etc.), page state (e.g., dirty, clean, etc.), and the like. In some implementations, PTEs are part of a multi-level hierarchy, which includes one or more page directory entries (PDEs) that support discovery of individual PTEs.

In embodiments, the TLB 108 facilitates virtual addressing, and is a dedicated form of cache that stores recently obtained PTEs mapping virtual and physical memory pages, as obtained from the memory page tables stored in the system memory 103. In general, when a processing unit 106 accesses a virtual memory address, the processor 102 determines if a physical mapping can be determined from a PTE stored in the TLB 108. If not, the processor 102 performs a "page table walk" of one or more memory page tables stored in system memory 103, in order to identify a relevant mapping between a virtual memory page containing the virtual memory address and a physical memory page containing a corresponding physical memory address. The processor 102 then stores this mapping as an entry within a slot of the TLB 108. In some embodiments, TLB 108 comprises multiple levels, similar to the memory cache 107.

In embodiments, control logic 109 comprises microcode (i.e., executable instructions) and/or physical logic gates that control operation of the processor 102. In general, control logic 109 functions as an interpreter between the hardware of the processor 102 and the processor ISA exposed by the processor 102 to executing applications (e.g., operating environment 110, application 111, etc.) and controls internal operation of the processor 102. In embodiments, the control logic 109 is embodied on on-processor storage, such as ROM, EEPROM, etc. In some embodiments, this on-processor storage is writable (in which case the control logic 109 is updatable), while in other embodiments this on-processor storage is read-only (in which case the control logic 109 cannot be updated).

The durable storage 104 stores computer-executable instructions and/or data structures representing executable software components. Correspondingly, during execution of these software components at the processor 102, one or more portions of these computer-executable instructions and/or data structures are loaded into system memory 103. For example, the durable storage 104 is illustrated as storing computer-executable instructions and/or data structures corresponding to an operating environment 110 and an application 111 (or a plurality of applications). Correspondingly, the system memory 103 is shown as storing at least one operating environment runtime 110' (e.g., machine code instructions and/or runtime data supporting execution of operating environment 110), and as storing at least one application runtime 111' (e.g., machine code instructions and/or runtime data supporting execution of application 111). The system memory 103 and durable storage 104 can also store other data, such a replayable execution trace 112 (i.e., replayable execution trace 112' stored in system memory 103 and/or replayable execution trace 112 stored in durable storage 104) and at least one data structure 113 that facilitates communication between operating environment 110 and control logic 109 during tracing of application 111.

In FIG. 1A, operating environment 110 is shown as potentially including a hypervisor 110a, and as including an operating system 110b (or a plurality of operating systems). Correspondingly, the operating environment runtime 110' is shown as potentially including a hypervisor runtime 110a', and as including at least one operating system runtime 110b'. For example, in some embodiments, the operating environment 110 comprises the hypervisor 110a executing directly on the hardware (e.g., processor 102, system memory 103, and durable storage 104) of computer system 101, and operating system 110b executing on top of the hypervisor 110a. In other embodiments, however, the operating environment 110 comprises an operating system 110b executing directly on the hardware (e.g., processor 102, system memory 103, and durable storage 104) of computer system 101.

In embodiments, the operating environment 110 and the control logic 109 cooperate to record a replayable execution trace 112 (or a plurality of replayable execution traces) of code execution at the processor 102. In embodiments, tracing techniques utilized by the operating environment 110 and control logic 109 to record a replayable execution trace 112 are based at least on the processor 102 recording influxes to at least a portion of the memory cache 107 during code execution. In embodiments, each replayable execution trace 112 comprises a "bit-accurate" record of execution of a corresponding context (e.g., process, operating system, virtual machine, enclave, hypervisor, etc.) as that context executed at the processor 102. As used herein, a replayable execution trace is a "bit accurate" record of that context's execution activity. This bit-accurate record enables machine code instructions that were previously executed as part of the context at the processing unit 106 to be replayed later, such that, during replay, these machine code instructions are re-executed in the same order, and consume the same data that they did during trace recording. While a variety of bit-accurate tracing approaches are possible, as mentioned, the embodiments herein record a bit-accurate execution trace based on logging at least some of the influxes to memory cache 107 during execution of a traced context (e.g., process, virtual machine, etc.). By logging at least some of these influxes during execution of the context, a replayable execution trace 112 of that context captures at least some of the memory reads that were performed by the machine code instructions that executed as part of the context.

The cache-based tracing techniques used by the embodiments herein are built upon an observation that the processor 102 (including its the memory cache 107) forms a semi- or quasi-closed system. For example, once portions of data for an executing context (i.e., machine code instructions and runtime data) are loaded into memory cache 107, processing unit 106 can continue executing that context—without any other external input—as a semi- or quasi-closed system for bursts of time. In particular, once the memory cache 107 is loaded with machine code instructions and runtime data, the execution unit 106b can load and execute those machine code instructions from the memory cache 107, using runtime data stored in the memory cache 107 as input to those machine code instructions, and using the registers 106a. So long as the data (i.e., machine code instructions and runtime data) that are needed for the processor 102 to execute that thread exists within the memory cache 107, the processor 102 can continue executing that context without further external input.

When processing unit 106 needs some influx of data (e.g., because a machine code instruction it is executing, will execute, or may execute accesses code or runtime data not already in the memory cache 107), the processor 102 may execute a "cache miss," importing data into the memory cache 107 from the system memory 103. As part of this process, the processor 102 may also refer to a PTE entry stored in the TLB 108, or perform a page walk of one or more memory page tables stored in system memory 103 and influx a PTE entry into the TLB 108. In an example, if a data cache miss occurs when a processing unit 106 executes a machine code instruction that performs a memory operation on a memory address within application runtime 110' storing runtime data, the processor 102 imports runtime data from that memory address in the system memory 103 to one of the cache lines of the data portion of the memory cache 107. Similarly, if a code cache miss occurs when a processing unit 106 tries to fetch a machine code instruction from a memory address within application runtime 110' storing application code, the processor 102 imports code data from that memory address in system memory 103 to one of the cache lines of the code portion of the memory cache 107. The processing unit 106 then continues execution using the newly-imported data, until new data is needed.

In embodiments, processor 102 is enabled to record a bit-accurate representation of execution of a context executing at the processor 102, by recording, into a trace data stream corresponding to the context, sufficient data to be able to reproduce the influxes of information into the memory cache 107 and the TLB 108 as processing unit 106 executes that context's code. For example, some approaches to recording these influxes operate on a per-processing-unit basis. These approaches involve recording, for each processing unit that is being traced, at least a subset of cache misses within the memory cache 107, and at least a subset of misses within the TLB 108, along with a time during execution at which each piece of data was brought into the memory cache 107 or the TLB 108 (e.g., using a count of instructions executed or some other counter). In some embodiments, these approaches involve also recording, for each processing unit that is being traced, any un-cached reads (i.e., reads from hardware components and un-cacheable memory that bypass the memory cache 107) caused by that processing unit's activity, as well as the side-effects of having executed any non-deterministic processor instructions (e.g., one or more values of registers 106a after having executed a non-deterministic processor instruction).

Figure 4:
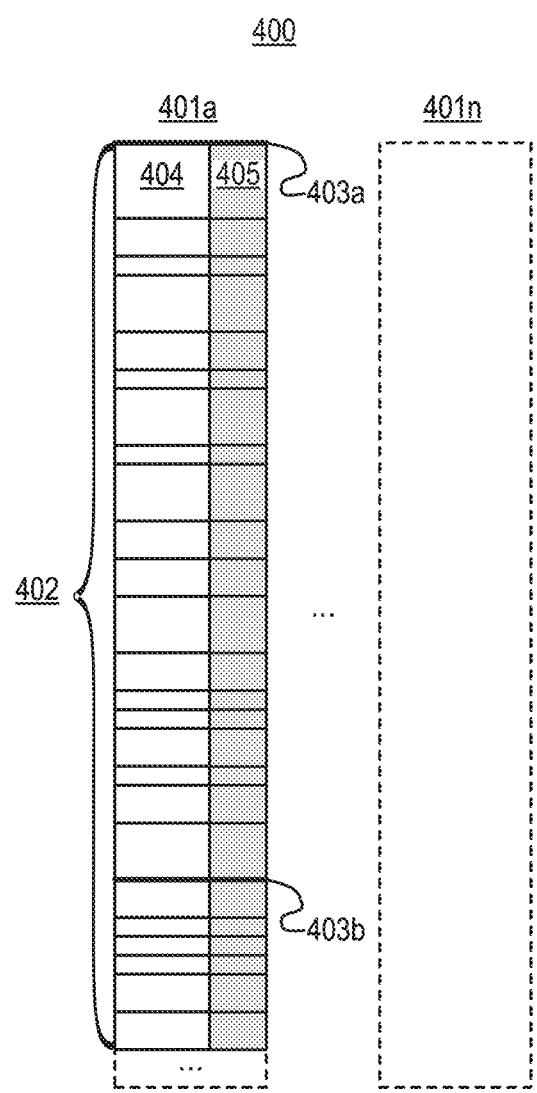
FIG. 4 illustrates an example of an execution trace.

FIG. 4 illustrates an example of an execution trace (e.g., replayable execution trace 112). In particular, FIG. 4 illustrates an execution trace 400 that includes a plurality of data streams 401 (i.e., data streams 401a-401n). In embodiments, each of data streams 401 represents execution of a different context, such as a different thread that executed from the code of operating environment 110 or application 111. In an example, data stream 401a records execution of a first thread of application 111, while data stream 401n records an $n^{th}$ thread of application 111. As shown, data stream 401a comprises a plurality of data packets 402. Since the particular data logged in each of data packets 402 can vary, these data packets are shown as having varying sizes. In embodiments, when using time-travel debugging technologies, one or more of data packets 402 records the inputs (e.g., register values, memory values, etc.) to one or more executable instructions that executed as part of this first thread of application 111. In embodiments, memory values are obtained as influxes to memory cache 107 and/or as uncached reads. In embodiments, data stream 401a also includes one or more key frames 403 (e.g., key frames 403a and 403b) that each records sufficient information, such as a snapshot of register and/or memory values, that enables the prior execution of the thread to be replayed, starting at the point of the key frame and proceeding forward.

In embodiments, an execution trace also includes the actual code that was executed. Thus, in FIG. 4, each of data packets 402 is shown as including a data inputs portion 404 (non-shaded) and a code portion 405 (shaded). In embodiments, the code portion 405 of each of data packets 402, if present, includes the executable instructions that executed based on the corresponding data inputs. In other embodiments, however, an execution trace omits the actual code that was executed, instead relying on having separate access to the executable code (e.g., a copy of application 111). In these other embodiments, each data packet specifies an address or offset to an appropriate executable instruction in an application binary image. Although not shown, it is possible that the execution trace 400 includes a data stream that stores one or more of the outputs of code execution. It is noted that used of different data input and code portions of a data packet is for illustrative purposes only, and that the same data could be stored in a variety of manners, such as by the use of multiple data packets.

If there are multiple data streams, in embodiments these data streams include sequencing events. Each sequencing event records the occurrence of an event that is orderable across different execution contexts, such as threads. In one example, sequencing events correspond to interactions between the threads, such as accesses to memory that is shared by the threads. Thus, for instance, if a first thread that is traced into a first data stream (e.g., data stream 401a) writes to a synchronization variable, a first sequencing event is recorded into that data stream (e.g., data stream 401a). Later, if a second thread that is traced into a second data stream (e.g., data stream 401b) reads from that synchronization variable, a second sequencing event is recorded into that data stream (e.g., data stream 401b). These sequencing events are inherently ordered. For example, in some embodiments each sequencing event is associated with a monotonically incrementing value, with the monotonically incrementing values defining a total order among the sequencing events. In one example, a first sequencing event recorded into a first data stream is given a value of one, a second sequencing event recorded into a second data stream is given a value of two, etc.

Some bit-accurate tracing approaches leverage extensions to memory cache 107 that track whether the value of a given cache line can be considered to have been captured into a replayable execution trace 112 on behalf of processing unit 106. In various implementations, these cache modifications extend slots in at least one level of the memory cache 107 to include additional "logging" bits (e.g., using portion 302c), or reserve one or more slots for logging bit use. These logging bits enable the control logic 109 to identify, for each cache line, a processing unit 106 (or a plurality of processing units) that consumed/logged the cache line. Use of logging bits can enable the control logic 109 to avoid re-logging cache line influxes for one execution context after a processing unit transitions to another execution context (e.g., another thread, another virtual machine, kernel mode, etc.) if that other context did not modify the cache line. Additionally, use of logging bits can enable a trace entry for one context to reference data already logged on behalf of another context.

Additional, or alternative, bit-accurate tracing approaches use memory markings as logging cues. More particularly, in embodiments, the operating environment 110 and the control logic 109 cooperate to record a replayable execution trace 111/111' based on categorizing different memory regions, such as physical memory pages in system memory 103, as logged or not logged. In embodiments, an execution context corresponds to at least one of a process executing on top of operating system 110b, operating system 110b itself, a virtual machine/memory partition created by hypervisor 110a, an enclave, a nested hypervisor, and the like. In embodiments, using memory markings as logging cues for processor-based execution tracing is based at least on (i) the operating environment 110 maintaining at least one data structure 113 that categorizes different memory regions as being logged and not logged, and on (ii) the control logic 109 using this data structure 113 to make logging decisions during tracing.

Additional, or alternative, bit-accurate tracing approaches utilize associative memory caches, coupled with memory cache way-locking features of some processors to reserve a subset of the cache for an entity that being traced, and then logs cache misses relating to that entity into a reserved subset of the cache. In particular, some bit-accurate tracing approaches utilize way-locking to reserve one or more cache "ways" for an entity that is being traced, such that the locked/reserved ways are used exclusively for storing cache misses relating to execution of that entity. Thus, by virtue of which way (or ways) to which a cache entry belongs, embodiments can determine whether or not a corresponding cache line has been logged.

Regardless of which tracking technique (or techniques) are used, in embodiments the control logic 109 logs based on influxes at a particular level in a multi-level memory cache. For example, in embodiments the control logic 109 logs influxes at an L2 memory cache level, even if one or more higher cache levels are present. Thus, in this example, the L2 memory cache level is referred to as a "recording" or "logging" cache level.

Some embodiments herein operate to reduce a size of a replayable execution trace 112 by employing memory address compression techniques when logging entries of a memory cache 107 (e.g., resulting from influxes to a recording cache level of memory cache 107) into the replayable execution trace 112. When logging memory cache entries into an execution trace, prior tracing techniques would log a full specification of a memory address associated with each memory cache entry, which included logging a specification of a memory page plus an offset from the start of the memory page to a subject cache line.

Figure 5:
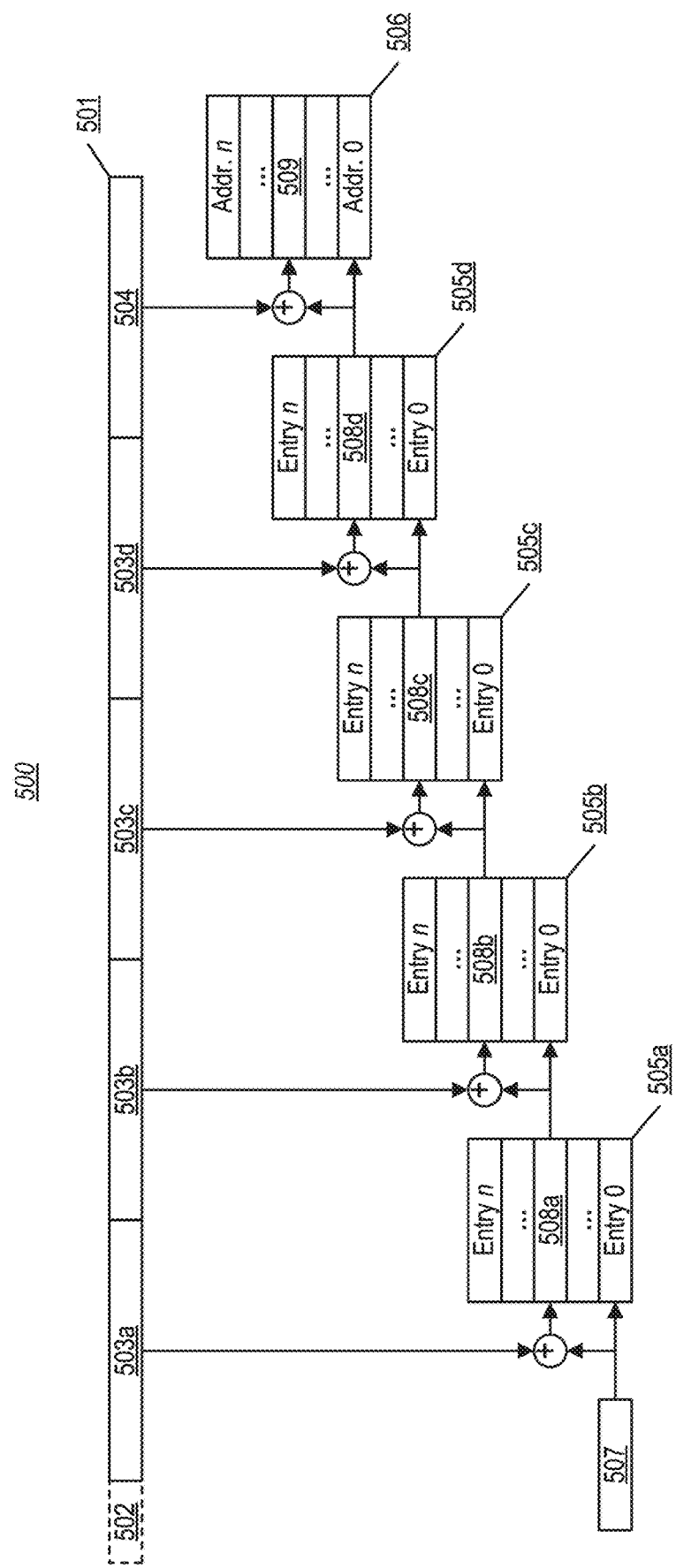
FIG. 5 illustrates an example of mapping a virtual memory address to physical memory.

To demonstrate these concepts, FIG. 5 illustrates an example 500 of mapping a virtual memory address to physical memory. In some embodiments example 500 represents a mapping to actual physical addresses in system memory 103, while in other embodiments example 500 represents a mapping to physical addresses as presented by a hypervisor. Example 500 shows a representation of a virtual memory address 501. As shown, virtual memory address 501 may comprise a reserved portion 502 comprising one or more bits that, while technically part of virtual memory address 501, are not actually used for addressing if present. Virtual memory address 501 also comprises a virtual page address 503 which specifies a virtual address of a virtual memory page. As shown, the virtual page address 503 comprises a plurality of virtual page address portions 503a-503d that map to a corresponding table within a page table structure 505 (comprising tables 505a-505d) and specifies an offset within each corresponding table. In example 500, virtual page address portion 503a (e.g., a global directory portion) maps to table 505a (e.g., a page global directory) and together with a base address 507 (e.g., stored in a register) its value specifies an entry 508a within table 501a. Virtual page address portion 503b (e.g., a upper directory portion) maps to table 505b (e.g., a page upper directory) and together with a base address stored in entry 508a its value specifies an entry 508b within table 501b. Virtual page address portion 503c (e.g., a middle directory portion) maps to table 505c (e.g., a page middle directory), and together with a base address stored in entry 508b its value specifies an entry 508c within table 501c. Virtual page address portion 503d (e.g., a table portion) maps to table 505d (e.g., a page table) and together with a base address stored in entry 508c its value specifies an entry 508d within table 501d. In embodiments, entry 508d is a PTE that points to a base address or offset of a memory page 506. Virtual memory address 501 also comprises an offset 504, which specifies an offset within the memory page 506 identified by entry 508d to a subject cache line within that memory page.

In example 500, there are four virtual page address portions 503a-503d making up virtual page address 503, though this could vary by implementation. Additionally, while each of the virtual page address portions 503a-503d are visually illustrated as having equal sizes, some embodiments use virtual page address portions with varying sizes (i.e., a varying number of bits per portion, and thus different corresponding table sizes). Furthermore, as will be appreciated by one of ordinary skill in the art, it may be possible to have virtual memory pages of varying sizes within the same computer system 101, such as differently sized virtual memory pages for different virtual memory spaces. Thus, as will be appreciated by one of ordinary skill in the art, an overall size of virtual page address 503 may vary within the same computer system 101 (e.g., different virtual page address sizes for virtual addresses used by different processes, based on differing virtual memory layouts for those processes); correspondingly, a size of the offset 504 can also vary within the same computer system 101 (e.g., different offset sizes for virtual addresses used by different processes, based on differing virtual memory layouts for those processes).

Figure 6:
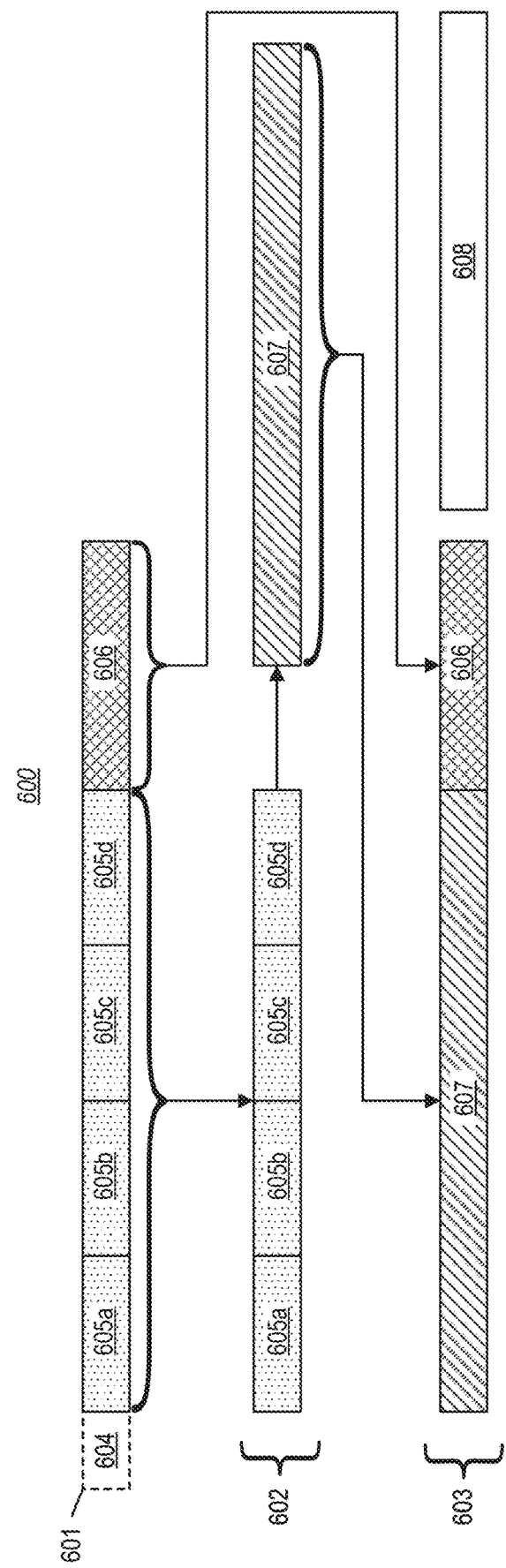
FIG. 6 illustrates an example of using a page table entry to transform a virtual memory address to a cache line physical memory address.

FIG. 6 illustrates an example 600 of using a PTE to transform a virtual memory address to a cache line physical memory address. Example 600 shows a representation of a virtual memory address 601. Similar to virtual memory address 501, virtual memory address 601 may comprise a reserved portion 604, shown in broken lines. Virtual memory address 601 also comprises a virtual memory page address 605 comprising a plurality of virtual memory page address portions 605a-605d, and an offset 606. Example 600 shows a mapping 602 (e.g., a PTE within TLB 108) between the virtual memory page address 605 and a physical memory page address 607. Additionally, example 600 shows at least a portion of a memory cache entry 603, with an address portion of the memory cache entry 603 comprising a cache line physical memory address (which comprises the physical memory page address 607 from the mapping 602, together with the offset 606 obtained from the virtual memory address 601). The memory cache entry 603 also comprises cache line data 608 addressed by the cache line physical memory address.

Prior tracing techniques would log this entire cache line physical memory address when logging this memory cache entry 603. Thus, when logging memory cache entries, prior tracing techniques would log a full specification of a memory address associated with each memory cache entry, which included logging a specification of a memory page (i.e., physical memory page address 607) plus a cache line offset to within that memory page to a cache line (i.e., offset 606). Since memory cache entries comprise a substantial portion of an execution trace, reducing the number of bits used to log each memory cache entry results in a technical effect of significant overall trace size reductions as compared to prior tracing techniques, which conserves processing, memory, and storage resources.

Figure 7A:
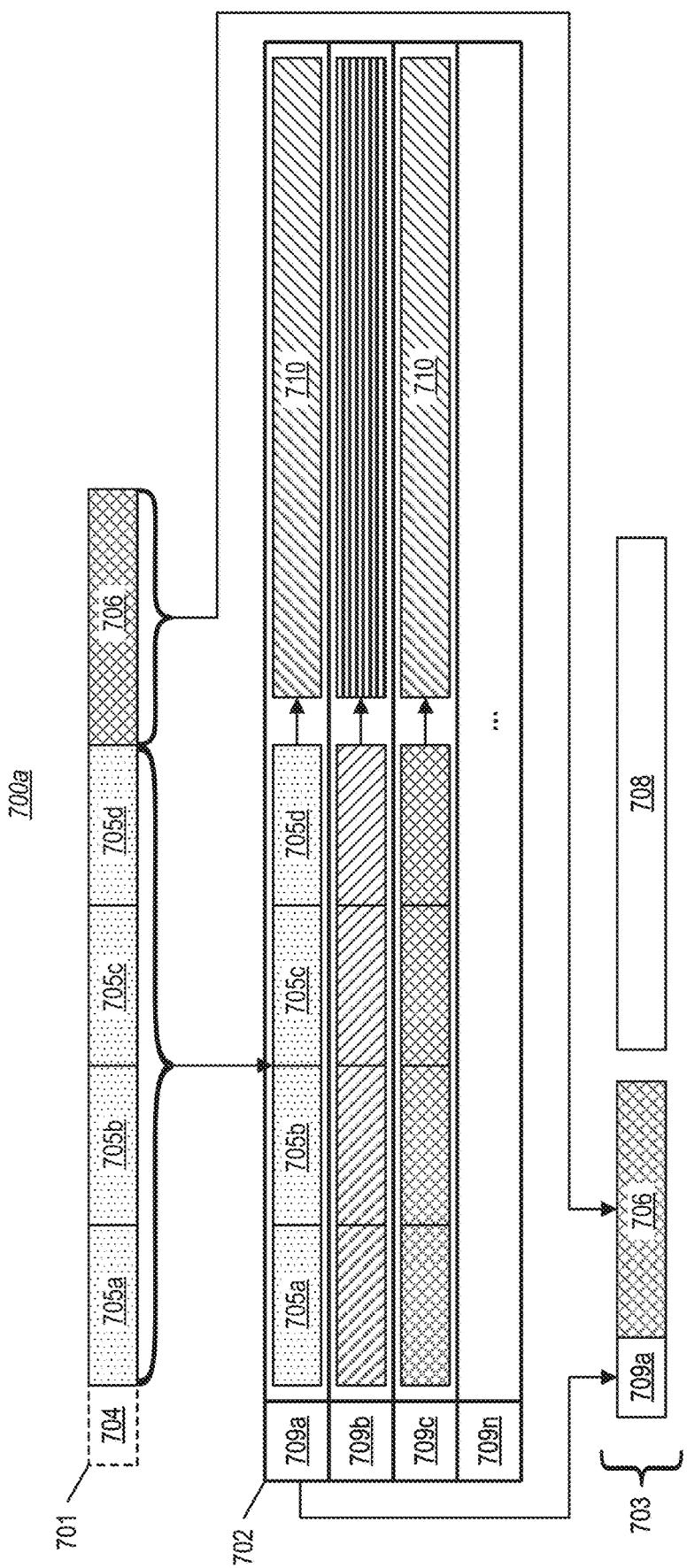
FIG. 7A illustrates an example of logging a cache entry in reference to a TLB entry.

Rather than logging a specification of a memory page when logging a given memory cache entry, memory address compression techniques described herein identify a logged TLB entry matching with at least a portion of a memory address associated with that memory cache entry, and log a reference to this TLB entry, along with an offset from the start of the memory page specified by the identified TLB entry to a subject cache line within that memory page. To demonstrate these concepts, FIG. 7A illustrates an example 700a of logging a cache entry in reference to a logged TLB entry. Example 700b shows a representation of a virtual memory address 701 which, similar to virtual memory address 601, may comprise a reserved portion 704, and which comprises a virtual memory page address 705 comprising a plurality of virtual memory page address portions 705a-705d, and an offset 706. Additionally, example 700b shows a TLB 702 comprising a plurality of TLB slots 709, including a TLB slot 709a which includes a mapping between the virtual memory page address 705 and physical memory page address 710. Additionally, example 700a shows at least a portion of a memory cache entry 703 (e.g., as part of replayable execution trace 112). In example 700a, the address portion of the memory cache entry 703 now comprises an identifier for a logged TLB entry corresponding to TLB slot 709a, together with the offset 706 obtained from the virtual memory address 701. The memory cache entry 703 also comprises cache line data 708 (or a reference to cache line data already stored in an execution trace). Comparing memory cache entry 603 and memory cache entry 703, it is clear that, so long as a number of bytes used to represent a logged TLB entry is less than a number of bytes used to specify a virtual memory page address 705, space savings are achieved within the execution trace.

Figure 7B:
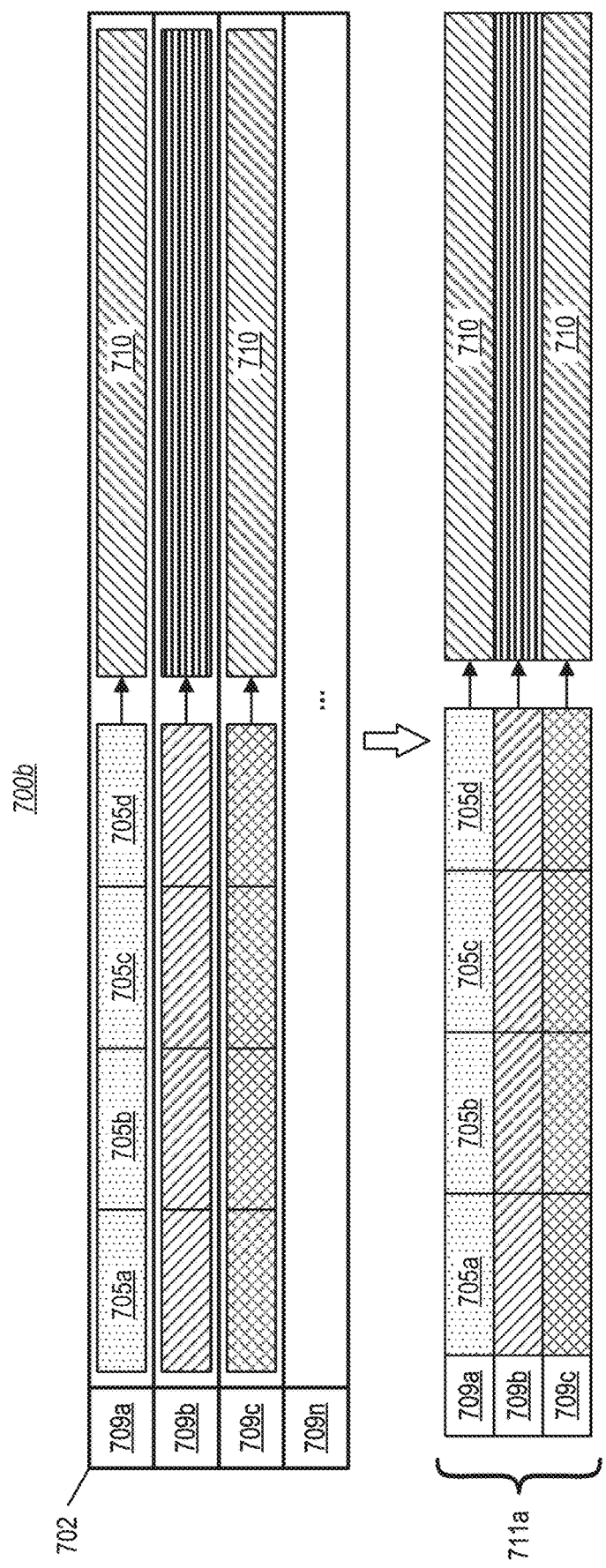
FIG. 7B illustrates an example of logging a TLB entry.

FIG. 7B illustrates an example 700b of logging a TLB entry. In particular, example 700b reproduces the TLB 702 of FIG. 7A, and also shows at least a portion of a TLB log 711a (e.g., as part of replayable execution trace 112) that stores the entries of the TLB 702. In particular, in example 700b, the TLB log 711a includes three log entries, each storing at least a virtual memory page address, a physical memory page address, and an identifier for the TLB entry that is logged. For instance, the first log entry stores an identifier for TLB slot 709a, and the virtual memory page address 705 and physical memory page address 710 for the slot. This identifier can be any form of identifier that uniquely identifies the TLB entry from among the live entries in the TLB 702. For instance, the identifier can comprise an identification of the TLB slot itself (e.g., a slot number), a pseudo-random value, or a value based on an incremented or decremented counter (e.g., a 32-bit value). In embodiments that use a value based on a counter, the counter may be reset when the TLB 702 is flushed. Notably, a TLB flush can comprise a full TLB flush in which all entries invalidated, or a tagged TLB flush in which all entries with a corresponding tag are invalidated. In embodiments, tags can comprise an Address Space Number (ASN), a process-context identifier (PCID), a virtual processor identifier (VPID), or combinations thereof. In embodiments, when a tagged TLB flush occurs, each logged TLB entry's tag (or an identifier of the TLB tag) is also logged into replayable execution trace 112. As mentioned, some processors may have multi-level TLBs, and thus a TLB entry may exist in two or more levels of the multi-level TLB (e.g., an inclusive TLB cache). In these embodiments, an identifier for a TLB entry may correspond to an identification of a slot in one of these upper TLB levels.

As mentioned, some embodiments operate with virtual memory pages of varying sizes within the same computer system 101, such as differently sized virtual memory pages for different virtual memory spaces, and that the size of the offset portion of a given virtual memory address is dependent on the virtual memory page. In embodiments, this page size information is captured into the replayable execution trace 112, which enables a size of the offset to also be determined from the replayable execution trace 112. This, in turn, enables matching of memory cache entries with TLB entries in environments with varying virtual memory page sizes. In various embodiments, a specification of a corresponding page size is directly logged when logging TLB entries, a specification of a corresponding page size is directly logged when logging memory cache entries, or page size information is logged indirectly by logging page walks.

At least some embodiments described herein also operate to omit physical memory addresses from an execution trace. As just shown in FIG. 7B, it is possible to log TLB with reference to both a virtual memory page address and a physical memory page address. However, the inventor has recognized that replay of an execution trace need not involve reproducing a physical memory layout that was used during recording. Thus, physical memory page addresses therefore can be omitted from logged TLB entries. However, in order to ensure that shared memory interactions can be properly reproduced during replay, the embodiments herein detect when two (or more) live TLB entries (i.e., entries that are present and valid in the TLB 108 at the same time) map to the same physical memory page address and ensure that an indication of such is recorded into the execution trace.

Figure 7C:
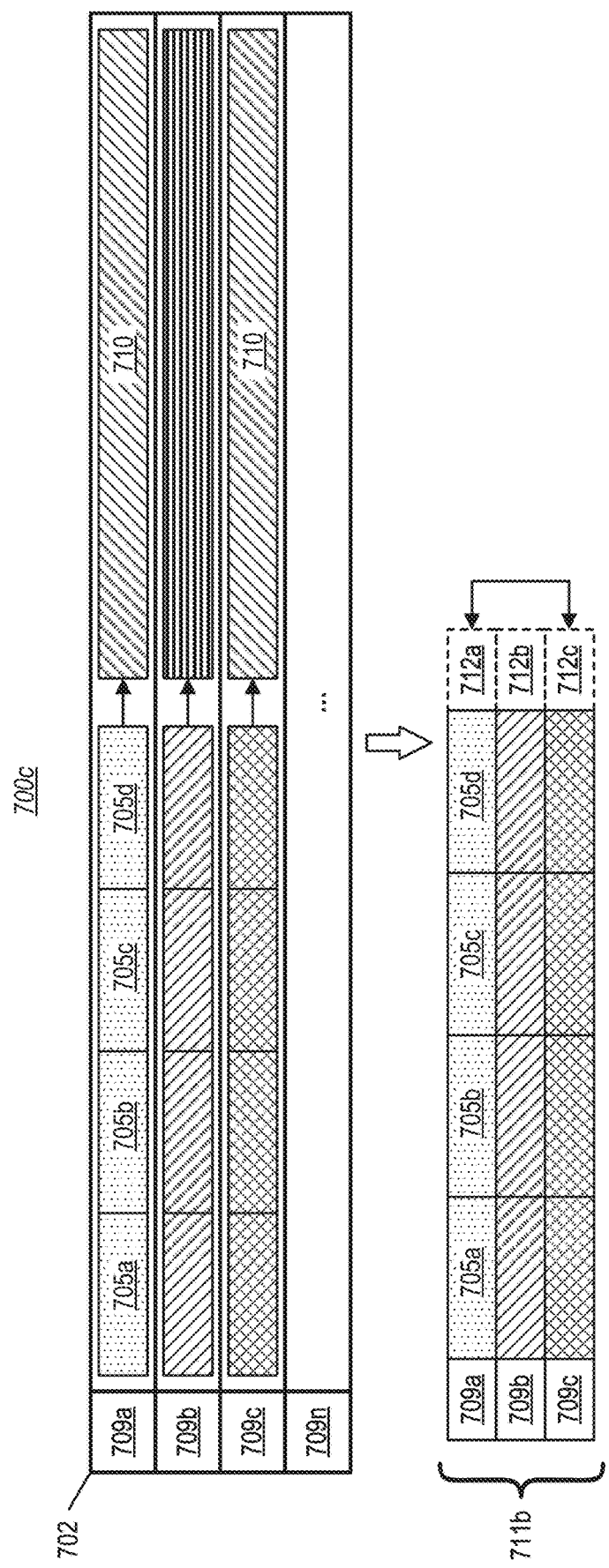
FIG. 7C illustrates an example of logging a TLB entry while omitting a physical memory page address.

FIG. 7C illustrates another example 700c of logging a TLB entry, while omitting a physical memory page address. In particular, example 700c reproduces the TLB 702 of FIG. 7A, and also shows at least a portion of a TLB log 711b (e.g., as part of replayable execution trace 112) that stores the entries of the TLB 702. In particular, in example 700b, the TLB log 711a includes three log entries, each storing at least a virtual memory page address and an identifier for the TLB entry that is logged. For instance, the first log entry stores an identifier for TLB slot 709a, and virtual memory page address 705 for the slot. This time, the log entry omits the physical memory page address 710. Like in example 700b, the identifier can be any form of identifier that uniquely identifies the TLB entry from among the live entries in the TLB 702. Notably, the TLB 702 contains two entries (i.e., TLB slot 709a and TLB slot 709c) that map to the same physical memory page address (i.e., physical memory page address 710). As such, the TLB log 711b also includes some indicia 711 that the corresponding log entries (i.e., the first log entry and the third log entry) relate to the same physical memory page address. In example 700c, this is demonstrated by an arrow connecting the indica 712a associated with the first log entry and the indica 712c associated with the third log entry. In embodiments, indica 712a and indica 712c comprise a common unique identifier, a mapping or association between log entry identifiers (e.g., an association between slot numbers corresponding to TLB entries, pseudo-random values identifying TLB entries, etc.), a description of how the TLB entries overlap on the physical memory page address, and the like.

Omitting a physical memory page addresses in an execution trace results in a technical effect of preventing potentially sensitive information from making it into an execution trace, thereby improving computer security. For example, if an execution trace is recorded in a multi-tenant environment (e.g., by recording a hypervisor), omitting a physical memory page addresses in an execution trace prevents potentially sensitive information about physical memory usage by tenants from being recorded into the execution trace. Additionally, by omitting physical memory page addresses from logged TLB entries, trace size reductions are achieved as compared to prior tracing techniques, thereby conserving processing, memory, and storage resources.

Rather than omitting a physical memory page addresses from TLB log entries, related embodiments obfuscate physical memory page addresses within TLB log entries. In particular, these embodiments record some derivative of a physical memory page address and log that derivative when logging a TLB entry. As used herein, the term "derivative" means any data that is deterministically derived from the physical memory page address, and which is unique for a given physical memory page address. In some embodiments, a derivative of a physical memory page address is an encrypted version of the physical memory page address, a hash of the physical memory page address, an encrypted hash of the physical memory page address, a one-way transformation of the physical memory page address (e.g., using an encryption key that is random and ephemeral), and the like. A recorded TLB entry that includes a derivative of a physical memory page address is much like the TLB entries in the TLB log 711*a* of FIG. 7B, with the derivative being logged, rather than the physical memory page addresses itself.

Notably, obfuscating physical memory page addresses within an execution trace still provides a technical effect of preventing potentially sensitive information from making it into an execution trace, thereby improving computer security. At the same time, obfuscating physical memory page addresses within an execution trace also enables analysis of a traced program's use of physical memory (even if the actual physical memory page addresses are not available), which can enable, for example, debugging of memory management routines.

Figure 1B:
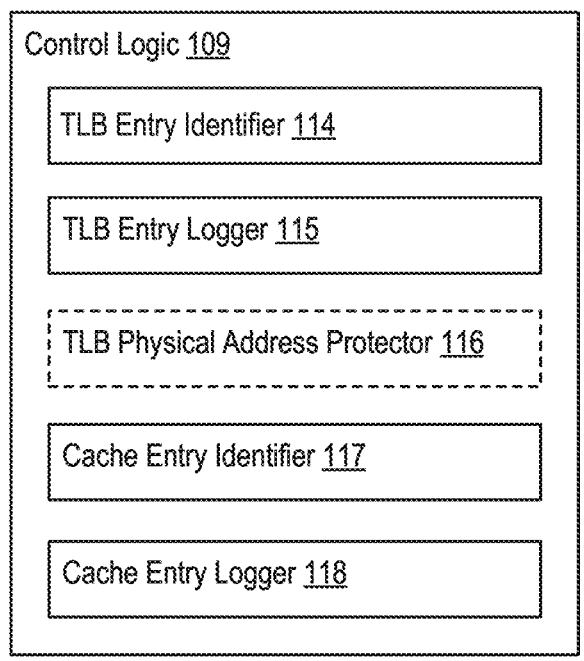
FIG. 1B illustrates an example of processor control logic that compresses memory addresses within an execution trace, and that is capable of physical memory address omission or obfuscation within the execution trace.

FIG. 1B illustrates additional detail of control logic 109, including components that operate to (i) reduce a size of a replayable execution trace 112 via new memory address compression techniques, and/or (ii) omit/obfuscate physical memory addresses within an execution trace. The depicted components of control logic 109 (e.g., a TLB entry identifier 114, a TLB entry logger 115, a TLB physical address protector 116, a cache entry identifier 117, and a cache entry logger 118), together with any sub-components, represent various functions that the control logic 109 might implement or utilize in accordance with various embodiments described herein. It will be appreciated, however, that the depicted components—including their identity, sub-components, and arrangement—are presented merely as an aid in describing various embodiments of the control logic 109 described herein, and that these components are non-limiting to how software and/or hardware might implement various embodiments of the control logic 109 described herein, or of the particular functionality thereof.

In general, the TLB entry identifier 114 identifies one or more TLB entries that are to be logged into a replayable execution trace 112. In embodiments, the TLB entry identifier 114 identifies such TLB entries when those entries are influxed into TLB 108 (e.g., as part of a memory page table walk), but it is possible for the TLB entry identifier 114 to identify these TLB entries at any time, such as when a tracing feature is enabled, when a TLB entry is accessed as part of processing a memory cache miss, etc. In general, the TLB entry logger 115 initiates logging of a TLB entry that was identified by the TLB entry identifier 114 into a replayable execution trace 112, while potentially detecting that two live and logged TLB entries maps to the same physical memory page addresses and ensuring that an indication of such is recorded into the replayable execution trace 112. In general, the TLB physical address protector 116 optionally protects a physical address within the replayable execution trace 112 during logging by the TLB entry logger 115, such as by causing the physical address to be omitted from the replayable execution trace 112, or by causing the physical address to be obfuscated within the replayable execution trace 112.

In general, the cache entry identifier 117 identifies one or more memory cache entries that are to be logged into a replayable execution trace 112. In embodiments, the cache entry identifier 117 identifies such memory cache entries when those entries are influxed into memory cache 107 (e.g., as part of a memory cache miss), but it is possible for the cache entry identifier 117 to identify these memory cache entries at any time, such as when a tracing feature is enabled, when a memory entry is accessed, etc. In general, the cache entry logger 118 initiates logging of a memory entry that was identified by the cache entry identifier 117 into a replayable execution trace 112. Rather than logging a full physical memory address, the cache entry logger 118 logs these cache entries by reference to a TLB entry that is presently live in the TLB 108, and that was logged by the TLB entry logger 115, plus an offset from the beginning of a memory page to a cache line.

In order to further describe operation of these components of control logic 109, the following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Figure 8:
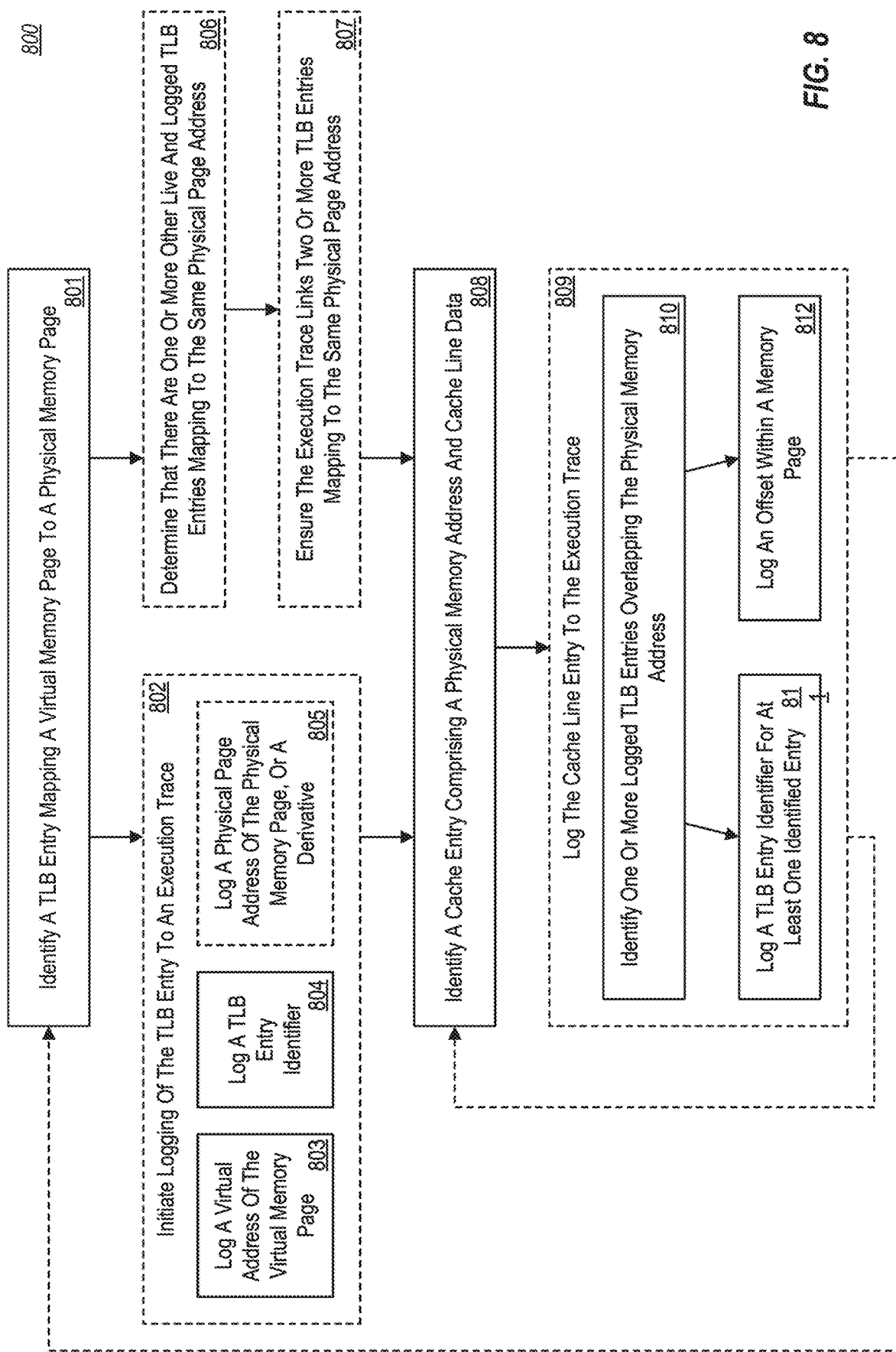
FIG. 8 illustrates a flow chart of an example method for memory address compression within an execution trace via reference to a TLB entry, including support for physical memory address omission or obfuscation within the execution trace.

FIG. 8 illustrates a flow chart of an example method 800 for memory address compression within an execution trace via reference to a TLB entry, including support for physical memory address omission or obfuscation within the execution trace. Method 800 will be described with respect to the components and data of computing environment 100*a*.

Method 800 comprises an act 801 of identifying a TLB entry mapping a virtual memory page to a physical memory page. In an example, the TLB entry identifier 114 identifies a TLB entry in TLB 108, such as the TLB entry at TLB slot 709*a* of TLB 702 in FIG. 7B. In embodiments, the identified TLB entry comprises a mapping between a virtual address (e.g., virtual memory page address 705) of a virtual memory page within a virtual address space and a physical address (e.g., physical memory page address 710) of a physical memory page within a hardware memory (e.g., system memory 103).

After act 801, method 800 may proceed to one or both of an act 802 of initiating logging the TLB entry to an execution trace (i.e., replayable execution trace 112), or an act 806 of determining that there are one or more other live and logged TLB entries mapping to the same physical page address. In FIG. 8, act 802 and act 806 are illustrated as being performed in parallel. However, one of ordinary skill in the art will appreciate that various implementations they could alternatively be performed serially, in either order. Alternatively, method 800 may proceed directly to act 808 (e.g., if the identified TLB entry is not logged, or to be logged).

As shown, act 802 comprises an act 803 of logging a virtual address of the virtual memory page. In an example, as part of logging the TLB entry at TLB slot 709a in TLB 702, the TLB entry logger 115 initiates logging of the virtual memory page address specified by virtual memory page address 705 into replayable execution trace 112.

Act 802 also comprises an act 804 of logging a TLB entry identifier. In an example, as part of logging the TLB entry at TLB slot 709a in TLB 702, the TLB entry logger 115 initiates logging of an identifier for the TLB entry corresponding to TLB slot 709a into replayable execution trace 112. The particular identifier used can vary widely depending on implementation, as long as the identifier uniquely identifies the TLB entry at TLB slot 709a from among other live TLB entries within TLB 702. In various examples, the TLB entry logger 115 logs at least one of an identification of the TLB slot itself (e.g., a slot number), a pseudo-random value, or a value based on an incremented or decremented counter (e.g., a 32-bit value). In embodiments that use a value based on a counter, the counter may be reset when the TLB 702 is flushed. As will be appreciated by one of ordinary skill in the art, it is possible that a counter could wrap around (i.e., exceed a value that can be represented by an allocated number of bits). In these situations, embodiments may restart the count but ensure that the same value is not assigned to two live TLB entries, re-log live TLB entries with new identifiers, flush the TLB, etc.

Act 802 may also comprise an act 805 of logging a physical page address of the physical memory page, or a derivative. In one example, as part of logging the TLB entry at TLB slot 709a in TLB 702, the TLB entry logger 115 initiates logging of physical memory page address 710 into replayable execution trace 112. In another example, as part of logging the TLB entry at TLB slot 709a in TLB 702, the TLB physical address protector 116 generates a derivative of physical memory page address 710, and the TLB entry logger 115 initiates logging of this derivative into replayable execution trace 112. In various examples, the TLB physical address protector 116 generates the derivative of the physical memory page address by encrypting the physical memory page address, by generating a hash of the physical memory page address, by generating a one-way transformation of the physical memory page address, or the like.

In FIG. 8, act 803, act 804, and act 805 are illustrated as being performed in parallel. However, one of ordinary skill in the art will appreciate that various implementations these acts could alternatively be performed serially, in any order.

In an example of act 806, in connection with logging the TLB entry at TLB slot 709a in act 802, the TLB entry logger 115 determines that there are one or more additional live entries within TLB 702 that also map to the physical memory page address 710. For instance, in FIG. 7A, the TLB entry at TLB slot 709c also maps to physical memory page address 710.

After act 806 (if present), method 800 also comprises an act 807 of ensuring the execution trace links two or more TLB entries mapping to the same physical page address. In an example, the TLB entry logger 115 logs some indicia 711 these two or more log entries relate to the same physical memory page address. In example 700c, this is demonstrated by an arrow connecting the indicia 712a and the indica 712c within the TLB log 711b, indicating that the corresponding entries are related by physical memory page address (i.e., physical memory page address 710). In embodiments, indicum comprise a common unique identifier, a mapping or association between log entry identifiers (e.g., an association between slot numbers corresponding to TLB entries, pseudo-random values identifying TLB entries, etc.), a description of how the TLB entries overlap on the physical memory page address, and the like.

Method 800 also comprises an act 808 of identifying a cache entry comprising a physical memory address and cache line data. In an example, the cache entry identifier 117 identifies a cache entry in memory cache 107 (or being influxed into memory cache 107) that is to be logged into an execution trace (i.e., replayable execution trace 112). In embodiments, the identified cache entry comprises an address portion (e.g., address portion 302a) comprising a physical memory page address (e.g., physical memory page address 710) and an offset, as well as a cache line portion (e.g., cache line portion 302b) comprising cache line data.

Method 800 may also comprise an act 809 of logging the cache line entry to the execution trace. In an example, the cache entry logger 118 initiates logging of the cache entry identified in act 808 into replayable execution trace 112. As shown, act 809 comprises an act 810 of identifying one or more logged TLB entries overlapping the physical memory address. In an example, the cache entry logger 118 determines that the physical memory address in the cache line (e.g., physical memory page address 710) overlaps with one or more live entries in the TLB 108 (e.g., the TLB entry at TLB slot 709a, or the TLB entry at TLB slot 709c), and which have been logged into replayable execution trace 112. Notably, some implementations of act 810 could alternatively identify one or more logged TLB entries overlapping a virtual memory address. In these implementations, the matching could include also matching some additional context (e.g., ASN, PCID, VPID, etc.) to avoid matching to a virtual address from a virtual address space of another entity (e.g., thread).

After act 810, act 809 also comprises an act 811 of logging a TLB entry identifier for at least one identified entry, and an act 812 of logging an offset within a memory page. In FIG. 8, act 811 and act 812 are illustrated as being performed in parallel. However, one of ordinary skill in the art will appreciate that various implementations they could alternatively be performed serially, in either order.

In an example of act 811, the cache entry logger 118 initiates logging of at least one identifier for a logged TLB entry that was identified in act 810 into replayable execution trace 112, such as an identifier for at least one of the TLB entry at TLB slot 709a or the TLB entry at TLB slot 709c. For instance, memory cache entry 703 comprises an address portion that includes an identifier for a logged TLB entry corresponding to TLB slot 709a. As discussed in connection with act 804, the particular identifier used to identify a logged TLB entry can vary widely depending on implementation, as long as the identifier uniquely identifies the TLB entry from among other live TLB entries. In various examples, the identifier comprises at least one of an identification of the TLB slot itself (e.g., a slot number), a pseudo-random value, or a value based on an incremented or decremented counter (e.g., a 32-bit value).

In an example of act 812, the cache entry logger 118 initiates logging of an offset into replayable execution trace 112, the offset specifying an offset from the beginning of a memory page to the start of a cache line. For instance, memory cache entry 703 comprises an address portion that includes an offset 706, which was originally sourced from virtual memory address 701.

As shown, method 800 may at least partially repeat by proceeding to act 801 (e.g., in response to an influx of a new TLB entry to TLB 108) or to act 808 (e.g., in response to an influx of a new memory cache entry to memory cache 107).

As mentioned, some embodiments operate with virtual memory pages of varying sizes within the same computer system 101, such as differently sized virtual memory pages for different virtual memory spaces, and that the size of the offset portion of a given virtual memory address is dependent on the virtual memory page. As such, it is possible for act 810 to identify two logged TLB entries that overlap with the physical memory address in different ways, depending on the size of the virtual memory pages corresponding to those TLB entries (and the size of their corresponding offsets). Accordingly, in embodiments, in act 812 the cache entry logger 118 also logs information describing how the physical memory address overlaps with one or more logged TLB entries.

Due to the possibility of virtual memory pages of varying sizes, there are generally four cases to consider when there are two TLB entries that overlap. In a first case, the TLB entries refer to the same memory range (i.e., both size and start). In a second case, the first TLB entry refers to a larger memory range (i.e., a superset entry) and the second TLB entry refers to a smaller subset of the larger memory range (i.e., a subset entry). In a third case, the first TLB entry refers to a smaller memory range (i.e., a subset entry) and the second TLB entry refers to a larger superset of the smaller memory range (i.e., a superset entry). In a fourth case, the first TLB entry and the second TLB entry refer to partially overlapping memory ranges.

In some embodiments, a subset entry is logged in preference to the superset entry, because the offset portion of the address match is smaller in size, thus resulting in a smaller log entry. In some embodiments, where one TLB entry already had logging initiated, but the other TLB entry has not, then the TLB entry where logging was already initiated is used (in preference to the other entry); however, the inverse is also possible. In some embodiments, where a superset TLB entry already had logging initiated, but the subset TLB entry has not, then logging of the subset TLB entry is initiated in preference to the superset entry; however, the inverse is also possible.

In one example application of method 800, some embodiments are directed to methods, systems, and computer program products for memory address compression within an execution trace via reference to a TLB entry. In an embodiment, a microprocessor (e.g., processor 102) comprises a processing unit (e.g., processing unit 106), a TLB comprising a plurality of TLB slots (e.g., TLB 108), a memory cache comprising a plurality of cache slots (e.g., memory cache 107), and control logic (109) configured to implement at least a portion of method 800.

In the example, the control logic causes the microprocessor to perform act 801 in order to identify a TLB entry within one of the plurality of TLB slots. In embodiments, the TLB entry comprises a mapping between a virtual address of a virtual memory page (e.g., virtual memory page address 705) within a virtual address space and a physical address of a physical memory page (e.g., physical memory page address 710) within a hardware memory. In embodiments, this performance of act 801 has a technical effect of enabling later tasks, such as logging of the TLB entry (e.g., act 802) and use of that logged data (e.g., act 810 and replay of replayable execution trace 112).

The control logic also causes the microprocessor to perform act 802 in order to initiate logging of the TLB entry into an execution trace (e.g., replayable execution trace 112), including performance of act 803 and act 804 in order to initiate logging of at least (i) the virtual address, and (ii) an identifier for the TLB entry. In embodiments, the identifier uniquely identifies the TLB entry from among a plurality of live entries in the TLB. In embodiments, this performance of act 802 has a technical effect of causing log data to be written to system memory 103 and/or durable storage 104, and of enabling later tasks, such as use of that logged data (e.g., act 810 and replay of replayable execution trace 112).

In embodiments, when initiating logging of the identifier for the TLB entry in act 804, the identifier for the TLB entry comprises an identification of the one of the plurality of TLB slots, a pseudo-random value, or a value based on an incremented or decremented counter that is reset upon a TLB flush. In embodiments, this logging of an identification of a TLB slot, a pseudo-random value, or a value that is based on an incremented or decremented counter has a technical effect of enabling a logged TLB entry to be later referenced by a logged memory cache entry.

In some embodiments, performance of act 802 includes performance of act 805, such that initiating logging of the TLB entry into the execution trace also includes initiating logging of (iii) the physical address of the physical memory page within the hardware memory. In embodiments, this performance of act 805 has a technical effect of enabling a program's use of physical memory to be reproduced and/or analyzed during replay.

Although not illustrated, in some embodiments, performance of act 802 includes initiating logging of (iii) a size of the virtual memory page or the physical memory page in connection with logging the TLB entry. In embodiments, this logging a size of the virtual memory page or the physical memory page has a technical effect of enabling appropriate divisions between virtual memory page addresses and offsets to be identified during replay.

The control logic also causes the microprocessor to, subsequent to identifying the TLB entry, perform act 808 in order to identify a cache entry within one of the plurality of cache slots. In embodiments, the cache entry comprises (i) a physical memory address corresponding to a cache line, and (ii) data of the cache line. In embodiments, the physical memory address comprises a physical memory page identification portion and an offset portion. In embodiments, this performance of act 808 has a technical effect of enabling later tasks, such as logging of the cache entry (e.g., act 809) and use of that logged data (e.g., replay of replayable execution trace 112).

The control logic also causes the microprocessor to perform act 809 in order to initiate logging of the cache entry into the execution trace, including performance of act 810 in order to match the physical memory page identification portion of the physical memory address with the TLB entry. In embodiments, this performance of act 810 has a technical effect of identifying one or more logged TLB entries overlapping the physical memory address. This, in turn, has a technical effect of enabling the cache entry to be logged in reference to at least one logged TLB entry, rather than using physical memory page address, thereby reducing an amount of space used to log the cache entry.

In some embodiments, matching the physical memory page identification portion of the physical memory address in act 810 comprises matching the physical memory page identification portion of the physical memory address with a plurality of TLB entries. In embodiments, this matching of physical memory page identification portion with a plurality of TLB entries has a technical effect of enabling logging of the cache entry in reference to a logged TLB entry that omits a physical memory page address mapping, or that has an obfuscated physical memory page address mapping.

The control logic also causes the microprocessor to, based on matching the physical memory page identification portion of the physical memory address with the TLB entry, perform act 811 and act 812 in order to initiate logging of at least: (i) the identifier for the TLB entry and (ii) the offset portion. In embodiments, this performance of act 811 and act 812 has a technical effect of enabling a logged cache entry to be matched to a TLB entry (by virtue of the logged identifier for the TLB entry), and of enabling a logged cache entry to be associated with a line of cache data (by virtue of the logged offset portion).

In embodiments, initiating logging the identifier for the TLB entry is based on determining that the TLB entry is a logged TLB entry among the matched plurality of TLB entries. In embodiments, a "logged TLB entry" is entry for which an initiation of logging has already occurred (e.g., act 802). In some embodiments, if the entry is flushed from the TLB the entry is considered non-logged (at least beginning at a time of the flush). In some embodiments, if the entry is overwritten in the TLB, the entry is considered non-logged (at least beginning at a time it was overwritten). In some embodiments, if the entry is marked invalid in the TLB, the entry is considered non-logged (at least beginning at a time it was marked invalid). In embodiments, determining that a TLB entry is a logged TLB entry among the matched plurality of TLB entries has a technical effect of ensuring that the matched TLB entry has been logged, and can therefore be referenced by a logged cache entry.

In embodiments, initiating logging of the identifier for the TLB entry is performed based on determining that the TLB entry was influxed into the TLB, and the TLB entry influx was as a result of a memory access that caused an influx of the cache entry.

In embodiments, initiating logging of the cache entry into the execution trace in act 809 also includes initiating logging of (iii) the data of the cache line. In alternative embodiments, initiating logging of the cache entry into the execution trace in act 809 also includes initiating logging of (iii) a reference to the data of the cache line that is already stored within the execution trace. In embodiments, logging the data of the cache line, or a reference to the data of the cache line, has a technical effect of enabling that data to be reproduced as an influx during a later trace replay.

In embodiments, the control logic configures the microprocessor to influx the TLB entry and the cache entry based on a single request by the processing unit to access a virtual memory address. In embodiments, has a technical effect of logging a TLB influx and a corresponding cache line influx together. In alternative embodiments, the control logic configures the microprocessor to, influx the TLB entry based on a first request by the processing unit to access a first virtual memory address, and to subsequently influx the cache entry based on a second request by the processing unit to access a second virtual memory address. In these alternative embodiments, the TLB entry remains a live TLB entry between the influx of the TLB entry based on the first request, through at least the subsequent influx of the cache entry based on the second request. In embodiments, this has a technical effect of linking a cache line influx with a TLB entry that was influxed separately from the cache line influx.

In some embodiments, the first virtual memory address is equal to the second virtual memory address. In embodiments, this can occur when the cache line is invalidated in the memory cache, but the same cache line is later influxed a second time. In embodiments, logging when the first virtual memory address is equal to the second virtual memory address has a technical effect of logging information indicating that two virtual addresses (or address ranges) map to the same physical page. In other embodiments, the first virtual memory address is different than the second virtual memory address (e.g., when the same physical memory address is referenced by two processes executing in different virtual memory spaces (such as in the case of shared memory), or when different addresses in the same page are covered by the same TLB entry but have different memory cache lines).

Accordingly, at least some embodiments described herein operate to reduce execution trace size via new memory address compression techniques that are employed when logging memory cache entries (e.g., resulting from memory cache influxes). These memory address compression techniques identify a logged TLB entry matching a memory address associated with that memory cache entry, and then log a reference to this TLB entry (rather than logging a specification of an address of a memory page, as would be done previously), along with an offset to the start of a cache line within a memory page specified by the TLB entry. The logged TLB entry reference enables an appropriate memory page for the logged memory cache entry to be later determined from the TLB entry.

In another example application of method 800, some embodiments are directed to methods, systems, and computer program products for physical memory address omission or obfuscation within an execution trace. In an embodiment, a microprocessor (e.g., processor 102) comprises a processing unit (e.g., processing unit 106), a TLB comprising a plurality of TLB slots (e.g., TLB 108), a memory cache comprising a plurality of cache slots (e.g., memory cache 107), and control logic (109) configured to implement at least a portion of method 800.

In the example, during a first instance of method 800 the control logic causes the microprocessor to perform act 801 in order to identify a first TLB entry in a first of the plurality of TLB slots. In embodiments, the first TLB entry comprises a first mapping between a first virtual address of a first virtual memory page within a first virtual address space and a physical address of a physical memory page within a hardware memory. In embodiments, this first performance of act 801 has a technical effect of enabling later tasks, such as logging of the TLB entry (e.g., act 802) and use of that logged data (e.g., act 806, act 810, and replay of replayable execution trace 112).

During the first instance of method 800, the control logic also causes the microprocessor to perform act 802 in order to initiate logging of the first TLB entry into an execution trace, including performance of act 803 and act 804 in order to initiate logging of at least (i) the first virtual address, and (ii) a first identifier for the first TLB entry. In embodiments, this first performance of act 802 has a technical effect of causing log data to be written to system memory 103 and/or durable storage 104, and of enabling later tasks, such as use of that logged data (e.g., act 806, act 810, and replay of replayable execution trace 112).

During a second instance of method 800, the control logic also causes the microprocessor to again perform act 801 in order to identify a second TLB entry in a second of the plurality of TLB slots. In embodiments, the second TLB entry comprises a second mapping between a second virtual address of a second virtual memory page within a second virtual address space and the physical address of the physical memory page within the hardware memory that is mapped to by the first TLB entry. In embodiments, this second performance of act 801 has a technical effect of enabling later tasks, such as logging of the TLB entry (e.g., act 802) and use of that logged data (e.g., act 806, act 810, and replay of replayable execution trace 112).

During the second instance of method 800, the control logic also causes the microprocessor to again perform act 802 in order to initiate logging of the second TLB entry into the execution trace, including performance of act 803 and act 804 in order to initiate logging of at least (i) the second virtual address, and (ii) a second identifier for the second TLB entry. In embodiments, this second performance of act 802 has a technical effect of causing log data to be written to system memory 103 and/or durable storage 104, and of enabling later tasks, such as use of that logged data (e.g., act 806, act 810, and replay of replayable execution trace 112).

In embodiments, when initiating logging of the first and second identifiers in act 804, at least one of (i) the first identifier for the first TLB entry or (ii) the second identifier for the second TLB entry comprises an identification of a corresponding one of the plurality of TLB slots, a pseudo-random value, or a value based on an incremented or decremented counter that is reset upon a TLB flush. In embodiments, this logging of first and second identifiers in act 804 has a technical effect of enabling the logged first and second TLB entries to be later referenced by a logged memory cache entry.

During the second instance of method 800, the control logic also causes the microprocessor to, in connection with initiating logging of the second TLB entry into the execution trace, perform act 806 in order to determine that the first TLB entry and the second TLB entry each (i) are live in the TLB, (ii) are logged into the execution trace, and (iii) have common mappings to the physical address. In embodiments, this second performance of act 806 has a technical effect of identifying two (or more) live TLB entries that match to the same physical address, enabling those entries to be linked in the execution trace.

During the second instance of method 800, the control logic also causes the microprocessor to, based at least on the determination, perform act 807 in order to ensure that the execution trace indicates that the first TLB entry and the second TLB entry each map to the physical address. In embodiments, this second performance of act 807 has a technical effect of linking the first TLB entry and the second TLB entry in the execution trace, which enables them to be treated as mapping to the same memory location during replay.

In some embodiments, the control logic configures the microprocessor to ensure that the execution trace indicates that the first TLB entry and the second TLB entry each map to the physical address in act 807 by, for each of the first TLB entry and the second TLB entry, also initiating logging of (iii) a third identifier that is common to the first TLB entry and the second TLB entry. In embodiments, this initiating logging of the third identifier has a technical effect of linking the first TLB entry and the second TLB entry in the execution trace, which enables them to be treated as mapping to the same memory location during replay.

As mentioned, some embodiments log page size information in order to enable matching of memory cache entries with TLB entries in environments with varying virtual memory page sizes. While this works when logging physical address information, it may be insufficient when physical addresses are omitted or obfuscated in an execution trace. In some embodiments, and particularly when omitting or obfuscating physical addresses in an execution trace, the control logic configures the microprocessor to ensure that the execution trace indicates that the first TLB entry and the second TLB entry each map to the physical address in act 807 by initiating logging of a description of how the first TLB entry and the second TLB entry overlap on the physical address. In embodiments, this initiating logging of the description of how the first TLB entry and the second TLB entry overlap on the physical address has a technical effect of enabling TLB entries associated with different virtual memory page sizes to be linked in the execution trace as overlapping on the same physical address, even when physical addresses are omitted or obfuscated.

In some embodiments, the control logic configures the microprocessor to ensure that the execution trace indicates that the first TLB entry and the second TLB entry each map to the physical address in act 807 by initiating logging, into the execution trace, an association between the first identifier for the first TLB entry and the second identifier for the second TLB entry. In embodiments, this initiating logging of the association between the first identifier for the first TLB entry and the second identifier for the second TLB entry has a technical effect of linking the first TLB entry and the second TLB entry in the execution trace, which enables them to be treated as mapping to the same memory location during replay.

In some embodiments, the control logic configures the microprocessor to ensure that the execution trace indicates that the first TLB entry and the second TLB entry each map to the physical address in act 807 by, for each of the first TLB entry and the second TLB entry, also initiating logging of a derivative of the physical address. In embodiments, this initiating logging of the derivative of the physical address has a technical effect of linking the first TLB entry and the second TLB entry in the execution trace, which enables them to be treated as mapping to the same memory location during replay.

In some embodiments, the control logic configures the microprocessor to, for each of the first TLB entry and the second TLB entry, also perform act 805 in order to initiate logging of (iii) a derivative of the physical address. In embodiments, this initiating logging of the derivative of the physical address has a technical effect of obfuscating the physical address in the execution trace, while still enabling analysis of physical memory usage.

In some embodiments the derivative of the physical address comprises an encrypted version of the physical address. In other embodiments, the derivative of the physical address comprises a hash of the physical address. In embodiments, this initiating logging of an encrypted version of the physical address or a hash of the physical address has a technical effect of obfuscating the physical address in the execution trace, while still enabling analysis of physical memory usage.

In some embodiments, the control logic also configures the microprocessor to, based at least on identifying the second TLB entry, perform act 808 in order to identify a cache entry within one of the plurality of cache slots. In embodiments, the cache entry comprises (i) a physical memory address corresponding to a cache line, and (ii) data of the cache line. In embodiments, the physical memory address comprises a physical memory page identification portion and an offset portion (i.e., from the start of a memory page specified by a TLB entry to the start of a cache line).

In embodiments, this performance of act 808 has a technical effect of enabling later tasks, such as logging of the cache entry (e.g., act 809) and use of that logged data (e.g., replay of replayable execution trace 112).

In some embodiments, the control logic also configures the microprocessor to perform act 809, including performance of act 810 in order to determine that there are plural live TLB entries on the physical address, and performance of act 811 and act 812 in order to initiate logging of the cache entry into the execution trace, including logging of at least: (i) an identifier selected from the group consisting of the first identifier and the second identifier, and (ii) the offset portion. In embodiments, this performance of act 809 has a technical effect of logging the cache entry in reference to at least one of the first TLB entry logged in the first instance of act 802, or the second TLB entry logged in the second instance of act 802. This performance of act 809 also has a technical effect of enabling the logged cache entry to be associated with a line of cache data.

In embodiments, determining that there are plural live TLB entries on the physical address comprises identifying at least one of (i) an identifier that is common to the first TLB entry and the second TLB entry, (ii) an association between the first identifier for the first TLB entry and the second identifier for the second TLB entry, or (iii) that the first TLB entry and the second TLB entry have a common derivative of the physical address. In embodiments, this identification has a technical effect of determining that plural logged TLB entries map to the physical address, even when those logged TLB entries omit or obfuscate the physical address, itself.

In embodiments, initiating logging of the cache entry into the execution trace in act 809 also includes initiating logging of (iii) the data of the cache line. In alternative embodiments, initiating logging of the cache entry into the execution trace in act 809 also includes initiating logging of (iii) a reference to the data of the cache line that is already stored within the execution trace. In embodiments, logging the data of the cache line, or a reference to the data of the cache line, has a technical effect of enabling that data to be reproduced as an influx during a later trace replay.

Accordingly, at least some embodiments described herein also operate to omit physical memory page addresses from an execution trace, with the recognition that replay of an execution trace need not involve reproducing a physical memory layout that was used during recording. In order to ensure that shared memory interactions can be properly reproduced during replay, the embodiments herein detect when two (or more) live TLB entries map to the same physical memory page address and ensure that an indication of such is recorded into the execution trace. Related embodiments obfuscate physical memory page addresses within an execution trace, rather than omitting them from the execution trace. In particular, these embodiments record some derivative of a physical memory page addresses as part of logging a TLB entry, such as by recording an encrypted version of the physical memory address, recording a hash of the physical memory address, recording a one-way transformation of the physical memory address, and the like.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented at a microprocessor that comprises a processing unit, a translation lookaside buffer (TLB) comprising a plurality of TLB slots, and a memory cache comprising a plurality of cache slots, the method comprising:

identifying a TLB entry within one of the plurality of TLB slots, the TLB entry comprising a mapping between a virtual address of a virtual memory page within a virtual address space and a physical address of a physical memory page within a hardware memory;

initiating logging of the TLB entry into an execution trace, including initiating logging of at least (i) the virtual address, and (ii) an identifier for the TLB entry, the identifier uniquely identifying the TLB entry from among a plurality of live entries in the TLB;

subsequent to identifying the TLB entry, identifying a cache entry within one of the plurality of cache slots, the cache entry comprising (i) a physical memory address corresponding to a cache line, and (ii) data of the cache line, the physical memory address comprising a physical memory page identification portion and an offset portion; and initiating logging of the cache entry into the execution trace, including,
matching the physical memory page identification portion of the physical memory address with the TLB entry, and
based on matching the physical memory page identification portion of the physical memory address with the TLB entry, initiating logging of at least: (i) the identifier for the TLB entry and (ii) the offset portion.

2. The method of claim 1, wherein initiating logging of the TLB entry into the execution trace also includes initiating logging of (iii) the physical address of the physical memory page within the hardware memory.

3. The method of claim 1, wherein initiating logging of the TLB entry into the execution trace also includes initiating logging of (iii) a size of the virtual memory page or the physical memory page.

4. The method of claim 1, wherein initiating logging of the cache entry into the execution trace also includes initiating logging of (iii) the data of the cache line.

5. The method of claim 1, wherein initiating logging of the cache entry into the execution trace also includes initiating logging of (iii) a reference to the data of the cache line that is already stored within the execution trace.

6. The method of claim 1, wherein the identifier for the TLB entry comprises an identification of the one of the plurality of TLB slots.

7. The method of claim 1, wherein the identifier for the TLB entry comprises a pseudo-random value.

8. The method of claim 1, wherein the identifier for the TLB entry is based on an incremented or decremented counter that is reset upon a TLB flush.

9. The method of claim 1, wherein matching the physical memory page identification portion of the physical memory address comprises matching the physical memory page identification portion of the physical memory address with a plurality of TLB entries.

10. The method of claim 9, wherein initiating logging the identifier for the TLB entry is based on determining that the TLB entry is a logged TLB entry among the matched plurality of TLB entries.

11. The method of claim 9, wherein initiating logging of the identifier for the TLB entry is performed based on determining that the TLB entry was influxed, and the TLB entry influx was as a result of a memory access that caused an influx of the cache entry.

12. The method of claim 1, wherein the microprocessor influxes the TLB entry and the cache entry based on a single request by the processing unit to access a virtual memory address.

13. The method of claim 1, wherein the method further comprises:
influxing the TLB entry based on a first request by the processing unit to access a first virtual memory address; and
subsequently influxing the cache entry based on a second request by the processing unit to access a second virtual memory address, the TLB entry remaining a live TLB entry between the influx of the TLB entry based on the first request, through at least the subsequent influx of the cache entry based on the second request.

14. The method of claim 13, wherein the first virtual memory address is equal to the second virtual memory address.

15. The method of claim 13, wherein the first virtual memory address is different than the second virtual memory address.

16. A memory device having stored thereon instructions that are executable by a processing unit to cause a microprocessor that includes a translation lookaside buffer (TLB) comprising a plurality of TLB slots and a memory cache comprising a plurality of cache slots to at least:
identify a TLB entry within one of the plurality of TLB slots, the TLB entry comprising a mapping between a virtual address of a virtual memory page within a virtual address space and a physical address of a physical memory page within a hardware memory;
initiate logging of the TLB entry into an execution trace, including initiating logging of at least (i) the virtual address, and (ii) an identifier for the TLB entry, the identifier uniquely identifying the TLB entry from among a plurality of live entries in the TLB;
subsequent to identifying the TLB entry, identify a cache entry within one of the plurality of cache slots, the cache entry comprising (i) a physical memory address corresponding to a cache line, and (ii) data of the cache line, the physical memory address comprising a physical memory page identification portion and an offset portion; and
initiate logging of the cache entry into the execution trace, including,
matching the physical memory page identification portion of the physical memory address with the TLB entry, and
based on matching the physical memory page identification portion of the physical memory address with the TLB entry, initiating logging of at least: (i) the identifier for the TLB entry and (ii) the offset portion.

17. The memory device of claim 16, wherein initiating logging of the TLB entry into the execution trace also includes initiating logging of (iii) the physical address of the physical memory page within the hardware memory.

18. The memory device of claim 16, wherein initiating logging of the TLB entry into the execution trace also includes initiating logging of (iii) a size of the virtual memory page or the physical memory page.

19. The memory device of claim 16, wherein initiating logging of the cache entry into the execution trace also includes initiating logging of (iii) the data of the cache line.

20. The memory device of claim 16, wherein initiating logging of the cache entry into the execution trace also includes initiating logging of (iii) a reference to the data of the cache line that is already stored within the execution trace.

* * * * *